US011205213B2

(12) United States Patent
Turner et al.

(10) Patent No.: US 11,205,213 B2
(45) Date of Patent: Dec. 21, 2021

(54) ITEM AVAILABILITY PREVIEW FOR DIFFERENT MERCHANT LOCATIONS

(71) Applicant: Amazon Technologies, Inc., Seattle, WA (US)

(72) Inventors: Kristin L. Turner, Seattle, WA (US); Philip Pinette, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 216 days.

(21) Appl. No.: 16/052,080

(22) Filed: Aug. 1, 2018

(65) Prior Publication Data

US 2020/0043077 A1  Feb. 6, 2020

(51) Int. Cl.
*G06Q 30/00* (2012.01)
*G06Q 30/06* (2012.01)
*G06Q 50/12* (2012.01)

(52) U.S. Cl.
CPC ..... *G06Q 30/0633* (2013.01); *G06Q 30/0631* (2013.01); *G06Q 30/0639* (2013.01); *G06Q 30/0641* (2013.01); *G06Q 50/12* (2013.01)

(58) Field of Classification Search
CPC .......... G06Q 30/0601; G06Q 30/0631; G06Q 30/0633; G06Q 30/0641; G06Q 50/12
See application file for complete search history.

(56) References Cited

U.S. PATENT DOCUMENTS

| 5,970,471 | A  | * | 10/1999 | Hill ........................ | G06Q 30/02 |
|           |    |   |         |                               | 705/26.8   |
| 6,587,835 | B1 | * | 7/2003  | Treyz ..................... | G06Q 20/12 |
|           |    |   |         |                               | 705/14.64  |
| 8,756,121 | B2 | * | 6/2014  | Gonsalves ............. | G06Q 30/08 |
|           |    |   |         |                               | 705/27.2   |
| 9,390,448 | B2 | * | 7/2016  | Chien ................ | G06Q 30/0639 |
| 9,727,907 | B2 | * | 8/2017  | Cooney .............. | G06Q 30/0633 |
| 10,353,538 | B2 | * | 7/2019 | Gammons ........... | G06F 3/04817 |
| 10,687,173 | B2 | * | 6/2020 | Westphal ............. | H04W 4/029 |
| 10,792,814 | B2 | * | 10/2020 | Hitchcock ............. | H04L 67/18 |
| 2003/0177072 | A1 | * | 9/2003 | Bared ................ | G06Q 30/0635 |
|           |    |   |         |                               | 705/26.81  |

(Continued)

OTHER PUBLICATIONS

"Locating the Mobile Customer," by Al Urbanski, DM News 35.5: 26-29, Haymarket Media Inc. (May 2013) (Year: 2013).*

(Continued)

*Primary Examiner* — Anne M Georgalas
(74) *Attorney, Agent, or Firm* — Lee & Hayes, P.C.

(57) ABSTRACT

A system may enable a customer to identify and order one or more items available at a first merchant located at a first geographic location for pick-up at or delivery from the first location. The system may also enable the customer to select a second merchant at a second geographic location and submit the order for the one or more items to the second merchant. The system may provide the customer with a preview of the availability of the ordered items, for example, the items unavailable, at the second location, and in some instances, suggested alternatives. As a result, the customer may be able to determine whether the ordered items are available at the second location and make an informed decision about whether to switch the order from the first location to the second location. The first and second merchants may be commonly owned or owned by different entities.

20 Claims, 16 Drawing Sheets

(56) References Cited

U.S. PATENT DOCUMENTS

| | | | |
|---|---|---|---|
| 2004/0093274 A1* | 5/2004 | Vanska | G06Q 30/0641 |
| | | | 705/26.7 |
| 2005/0160014 A1* | 7/2005 | Moss | G06Q 30/00 |
| | | | 705/26.61 |
| 2006/0190348 A1* | 8/2006 | Ofer | G06Q 30/0631 |
| | | | 705/26.7 |
| 2007/0150369 A1* | 6/2007 | Zivin | G06Q 30/0631 |
| | | | 705/26.64 |
| 2010/0026526 A1* | 2/2010 | Yokota | G08G 1/096838 |
| | | | 340/996 |
| 2012/0123673 A1* | 5/2012 | Perks | G06Q 30/0625 |
| | | | 701/426 |
| 2014/0052615 A1* | 2/2014 | Andersen | G06Q 30/0641 |
| | | | 705/39 |
| 2014/0089133 A1* | 3/2014 | Argue | G06Q 30/0282 |
| | | | 705/26.7 |
| 2014/0095273 A1* | 4/2014 | Tang | G06Q 30/0283 |
| | | | 705/14.1 |
| 2014/0214591 A1* | 7/2014 | Kotinaga | G06Q 30/0631 |
| | | | 705/26.7 |
| 2014/0258030 A1* | 9/2014 | Koch | G06Q 30/0631 |
| | | | 705/26.8 |
| 2015/0095191 A1 | 4/2015 | Hu | |
| 2015/0100433 A1 | 4/2015 | Choy et al. | |
| 2017/0024804 A1* | 1/2017 | Tepfenhart, Jr. | G06Q 30/0635 |
| 2019/0187949 A1* | 6/2019 | Sugimoto | G07F 17/16 |

OTHER PUBLICATIONS

The PCT Search Report and Written Opinion dated Oct. 16, 2019, for PCT Application No. PCT/US2019/044374, 10 pages.

\* cited by examiner

ITEM AVAILABILITY PREVIEW FOR DIFFERENT MERCHANT LOCATIONS

BACKGROUND

Customers may now order items from an online merchant via the Internet for local pick-up or local delivery. In some instances, the merchant may have two or more merchant locations within a reasonable distance of the customer for pick-up or delivery. However, one or more of the merchant locations may not have the same items in inventory. As a result, if the customer orders a number of items available for pick-up or delivery from a first merchant location, one or more of those items may not be available from a second merchant location. In such situations, if the customer decides to order the items from a second merchant location, the customer may not be able to determine whether those items are available at the second location. This may lead to dissatisfaction if the customer decides to order the items from the second merchant location, only to be advised later that some of the items are not available. This may result in a less than satisfying customer experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
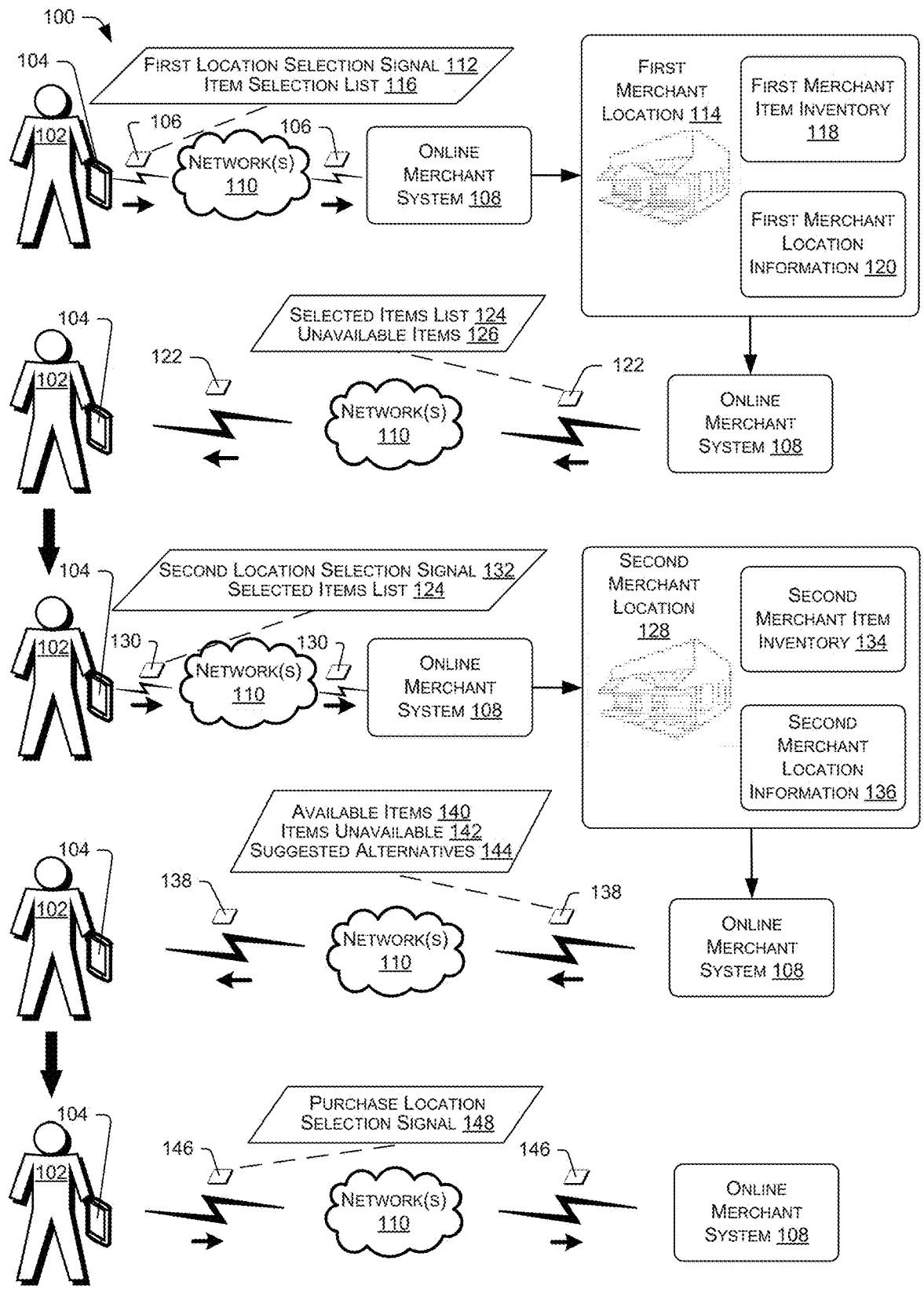
FIG. 1 illustrates an example system for providing a customer with a preview of items available at example first and second merchant locations.

This disclosure is generally directed to systems and/or processes for providing a preview of items available (e.g., available and/or unavailable) from a second merchant location based on items selected for pick-up at, or delivery from, a first merchant location. For example, a customer may access an online merchant website, mobile application, etc., identify one or more items available at a first merchant located at a first geographic location for pick-up or delivery, and create a virtual item selection list including the one more items to be picked-up at or delivered from the first merchant at the first location. For example, the item selection list may correspond to a virtual shopping cart including the one or more items desired for pick-up or delivery from the first geographic location. In some situations, the customer may consider instead picking-up or receiving delivery from a second merchant located at a second geographic location. In some examples, the second merchant may be either commonly owned by a commercial entity that owns the first merchant, or the owner of the second merchant may be owned by a commercial entity different from the commercial entity that owns the first merchant. Using a user device, the customer may select the second merchant and submit the virtual selection list including the one or more desired items for pick-up or delivery from the second location. In some examples, the system and/or processes may result in the customer receiving a preview at the user device showing the availability of the ordered items (e.g., the items available and/or unavailable) at the second merchant location. As a result, in some examples, the customer may be able to determine whether the ordered items are available at the second merchant location, and make an informed decision about whether to switch the order from the first merchant location to the second merchant location, or to maintain the order at the first merchant location. This may prevent or reduce the likelihood of situations in which the customer switches the order from the first merchant location to the second merchant location, only to realize later that the second merchant location does not have one or more of the ordered items in inventory, and thus, cannot provide the unavailable items for pick-up or delivery.

As an example, a system may be used to order items (e.g., groceries) from a grocer via an online merchant website, mobile application, etc., for pick-up from a first grocer or delivery from the first grocer at a first geographic location. For example, a customer may use a selection menu to select items from the first grocer and submit an item selection list (e.g., a virtual shopping cart) including the selected items to the online merchant system. In some examples, the system may be configured to compare the selected items to items available in inventory at the first grocer location, and send a signal to the customer identifying items available for pick-up or delivery from the first grocer at the first location. In some examples, the online system, once the customer selects the first merchant location, may provide the customer, via a user device providing a user interface, with a menu or catalog of items available at the first merchant location, and the customer may create the item selection list using the menu or catalog. The online system, in some examples, may use the item selection list to generate a selected items list, which, in some examples, may correspond to a virtual shopping cart including the items from the item selection list. The system may also include on option for the customer to select from one or more additional choices of different grocers at respective different geographic locations for submitting the same item selection list. At least some of the grocers may be commonly owned or part of the same chain, or in some examples, at least some of the different grocers may be owned by different entities or may be part of a different chain of grocers. In some examples, the system may be configured compare the inventory available at the selected different grocer location and send a signal to the customer identifying the items unavailable from the item selection list, and/or in some examples, the items available, at the selected different grocer. For example, the system may provide the customer via the user device an indication of the items from the selected items list available at the first grocer location that are not available at the selected different grocer location. Thereafter, the customer may select whether to order the items from the first grocer or the second grocer.

In some examples, the system may provide suggested alternatives to the items in the selected items list that are not available from the second merchant location. In some examples, the suggested alternatives may be item substitutes, and the item substitutes may include items having an item type in common with the unavailable items, and at least one of a different item origin, a different item brand, a different item quantity/size, a different item price, or other different characteristics (e.g., characteristics such as organic, gluten-free, or non-genetically modified). In some examples, the suggested alternatives may be based on items previously selected by the customer and/or based on customer-defined preferences. For example, a customer may be lactose intolerant, and the online merchant system may be configured to determine this by noting a customer's history indicating a consistent decision to not accept past suggestions including lactose-based products. In some examples, the online merchant system may determine this based on a user-defined profile indicating lactose intolerance. In some such examples, the online merchant system may be configured to not provide lactose-based products in the suggested alternatives. In some examples, the system may also be configured to provide the customer with information about the second merchant location. For example, the system may provide information about attributes of the second merchant location that might be attractive to the customer, such as, for example, amenities at the second merchant location. The system may also, in some examples, provide the user with information about the geographic location of the second merchant location, such as traffic conditions along a route between the user device and the second merchant location, traffic conditions at the second merchant location, and/or weather conditions at the second merchant location, any of which may be provided by a third party.

Some examples of the systems and processes described herein may result in operating and using computing resources more efficiently, for example, such that the use of power, network bandwidth, processing time, and/or memory is reduced. For example, providing a customer with a preview of unavailable items from a second merchant location may reduce the number of item searches conducted by the customer, thereby reducing consumption of computing resources. In addition, for examples that provide suggested alternatives for unavailable items, such systems may reduce the likelihood that the customers initiate additional searches for the unavailable items by providing the acceptable alternatives. In addition, in examples that tailor the suggested alternatives to particular customer preferences, the suggested alternatives have a greater likelihood of being selected by the customer, and thus, may reduce additional searching by the customer. Additionally, some examples of the online merchant system may provide an improved customer experience by providing customers with an opportunity to make a more informed decision about switching from a first merchant location to a second merchant location.

In some examples, the first merchant and the second merchant may not be commonly owned or may not be part of the same chain of merchants. Some examples of the system may facilitate shopping at different merchants, even though two or more of the different merchants may be owned by different entities or may be part of different merchant chains. In some such examples, the systems and processes described herein may enhance the user experience by providing a way for the user (e.g., a customer) to create a selected items list of items available at a first merchant's location and determine whether a second merchant location has those same items available without visiting a second website associated with the owner (or chain) of the second merchant location and recreating the selected items list for submission via the second website. Rather, the user may merely select from a menu of different merchants another merchant location and submit the same selected items list. The system, according to some examples, determines items from the selected items list that are not available from the second merchant location and displays the unavailable items via the user device. In examples that provide suggested alternatives including item substitutes for items unavailable at the second merchant location, the user may select items from the suggested alternatives list and update the selected items list with the item substitutes. Such examples may permit a user to quickly and efficiently determine whether different merchant locations have the desired items, and if some of the desired items are unavailable, select item substitutes for the items unavailable without manually searching for them, and in some examples, without the need to switch between multiple websites. Thus, such examples may further result enhancing the user experience and in operating and using computing resources more efficiently, for example, such that the use of power, network bandwidth, processing time, and/or memory is reduced.

The techniques and systems described herein may be implemented in a number of ways. Example implementations are provided below with reference to the following figures.

FIG. 1 illustrates an example system 100 for providing a customer with a preview of items available at example first and second merchant locations. As shown in FIG. 1, an example user 102 with an example user device 104 may send a first signal 106 to an online merchant system 108. For example, the user 102 may be a customer, and the user device 104 may include any computer device including a transceiver for sending and receiving signals, for example, via one or more network(s) 110, as described herein.

The online merchant system 108 may be any entity, server(s), platform, etc., that offers items (e.g., products, services, food/drink items, etc.) to the users 102 (e.g., customers) via an electronic marketplace (e.g., a website, a mobile application, etc.) associated with the online merchant system 108. That is, the users 102 may access the electronic marketplace via corresponding user devices 104 for the purpose of searching for, viewing, selecting, acquiring (e.g., purchasing, leasing, renting, borrowing, lending, etc.), etc., items. The items may be provided directly on behalf of a different entities, such as one or more merchants. That is, via a website, an electronic marketplace, and/or a mobile application associated with the online merchant 108, the users 102 may place orders for items to be provided by the merchants, for example, for pick-up from the merchant location or for delivery from the merchant location. Alternatively, users 102 may place orders directly with the merchants, such as via a merchant website, a mobile application associated with a merchant, etc. In some examples, provided that one or more ordered items are to be prepared/provided by a merchant, the merchant may prepare/provide the item(s) at one or more merchant locations of the merchant (e.g., a warehouse, a retail store, a fulfillment center, etc.). The ordered items may then be pick-up or transported to a delivery location associated with a user 102 that ordered the item(s).

The merchants may include any entity that provides and/or prepares items (e.g., products, services, food/drink items, etc.) to/for the users 102. The items may be offered for sale, lease, rent, etc., via a physical merchant location (e.g., a brick-and-mortar retail store), via a merchant-branded website (and/or a website associated with the online merchant system 108 or another entity), or via an application that resides on the user devices 104. In some examples, a merchant may be mobile in nature, and such a merchant need not be situated in a fixed location, and instead may move from a first physical location to a second physical location. For instance, examples of mobile merchants may include food trucks, a food carts (e.g., a hot dog or ice cream cart/vendor), or any other type of merchant that offers items at different physical locations at different times. The merchant may store items at its merchant location (e.g., a warehouse, a retail/physical store, etc.), or may maintain ingredients that are assembled for the users 102. For the purpose of this discussion, the term "merchant location" may correspond to a physical location associated with a merchant in which orders are fulfilled and items are picked-up by the user 102 or from which the items are delivered to the user 102.

Moreover, the merchants may be any type of merchant that offers any type of items (e.g., products, services, etc.), such as a grocery store that offers food items, a florist that offers flowers, a hardware store that offers tools and other home supplies, etc. Moreover, the user 102 (e.g., a customer) may include any person or entity that interacts with the online merchant system 108 for the purpose of ordering, acquiring, purchasing, etc., items from the online merchant system 108 on behalf of the merchants. The users 102 may include in-store customers that purchase or consume the items provided by the merchants at the current physical location of the merchants, and remote customers that also order items from the merchants via the online merchant system 108, but that either pick up the items from the current physical location of the merchants (i.e., a merchant location) or have the items delivered to a physical location associated with the customers. The customers may interact with the online merchant system 108 and/or the merchants via corresponding user devices 104, which may include cellular telephones, tablet devices, laptop computers, desktop computers, gaming consoles, electronic book (eBook) reader devices, and so on.

The network(s) 110 may facilitate communications and/or interactions between content server(s) of the online merchant system 108, the user devices 104, and/or devices associated with deliverers that pick up ordered items from the merchant locations and deliver the ordered items to a physical location associated with the user 102 that placed the order (e.g., a residence, a workplace, etc.). The network(s) 110 may facilitate such communications/interactions via any type of network, such as a public wide-area-network (WAN) (e.g., the Internet), which may utilize various different technologies including wired and wireless technologies. Moreover, content servers may contain any number of servers that are possibly arranged as a server farm. Other server architectures may also be used to implement the content servers.

In some examples, the first signal 106 may include one or more of a first location selection signal 112 indicative of a first merchant location 114 and an item selection list 116 indicative of a plurality of items desired for purchase from the first merchant at the first merchant location 114. For example, the first location selection signal 112 may result from the user 102 selecting the first merchant location 114 from a menu of available merchant locations provided on a user interface of the user device 104. In some examples, the user 102 may have an account with the online merchant system 108, including user preferences relating to merchant locations preferred by the user 102. In such examples, the first signal 106 may include the merchant location information. In some examples, the online merchant system 108 may be configured to select the first merchant location 114 based on the first signal 106, which may include an indication of the location of the user device 104. For example, the first merchant location 114 may be geographically close to the user device 104.

As shown in FIG. 1, in some examples of the system 100, the online merchant system 108 may receive the first signal 106, including the first location selection signal 112 and determine the merchant location corresponding to the first location selection signal 112. For example, as shown in FIG. 1, the first location selection signal 112 may be used by the online merchant system 108 to identify the first merchant location 114 as the merchant location selected by the user 102 from which to pick-up the ordered items or from which the ordered items should be delivered. Based at least in part on the first merchant location 114, in some examples, the online merchant system 108 may access a first merchant item inventory 118 and compare items identified for order in the item selection list 116 with items in the first merchant item inventory 118. Based at least in part on this comparison, the online merchant system 108 may, in some examples, determine the items ordered by the user 102 that are available from the first merchant location 114, for example, based at least in part on the item selection list 116 and the first merchant item inventory 118. In some examples, as shown in FIG. 1, the online merchant system 108 may also access first merchant location information 120 relating to characteristics associated with the first merchant location 114, for example, as explained herein.

In some examples, the online merchant system 108, once the user 102 selects the first merchant location 114, may provide the user 102, via the user device 104 providing a user interface, with a menu or catalog of items available at the first merchant location 114, and the user 102 may create the item selection list 116 using the menu or catalog. The online merchant system 108, in some examples, may use the item selection list 116 to generate a selected items list, which, in some examples, may correspond to a virtual shopping cart including the items from the item selection list 116.

In some examples, the online merchant system 108 may generate, based at least in part on the first items available, a first availability signal 122 indicative of the first items available at the first merchant location 114. For example, as shown in FIG. 1, the online merchant system 108 may send the first availability signal 122 via the network(s) 110 to the user device 104, and the user device 104 may provide the user 102 with information about the items available from the first merchant location 114 for pick-up or delivery based at least in part on the first availability signal 122. For example, the user device 104 may display a user interface indicating the items available (e.g., a selected items list 124 (e.g., a virtual shopping cart) and/or unavailable items 126) from the order at the first merchant location 114.

In some examples of the system 100, for example, as shown in FIG. 1, the online merchant system 108 may provide an ability for the user 102 via the user device 104 to determine which items from the order are available for pick-up delivery from a merchant location different than the first merchant location 114. For example, the user 102 may decide for various reasons that it might be preferable to order the items of the selected items list 124 from a second merchant at a second merchant location 128. For example, the online merchant system 108 may provide the user device 104 with a user interface that facilitates selection by the user 102 from a list of merchants a different merchant having a different geographic merchant location than the first merchant location 114. In some examples, the different merchants may be based on user preferences in the user's account, and/or based on the location of the user device 104.

In some such examples, the user 102, using the user device 104, may send a second signal 130 to the online merchant system 108 via the network(s) 110. In some examples, the second signal 130 may include one or more of a second location selection signal 132 indicative of the second merchant location 128 and the selected items list 124 indicative of the plurality of items desired for purchase. In some examples, the first item signal may be identical or similar to the item selection list 116 sent to the online merchant system 108 relating to the items desired to be ordered from the first merchant location 114 and/or the selected items list 124. In some examples, the user 102 may use a menu provided on a user interface on the user device 104 by the online merchant system 108 to modify the items from the item selection list 116 and/or the selected items list 124. In some examples, the second location signal 128 may result from the user 102 selecting the second merchant location 128 from a menu of available merchant locations provided on a user interface of the user device 104 by the online merchant system 108.

The online merchant system 108 may receive from the user device 104 the second signal 130, including the second location selection signal 132 and determine the merchant location corresponding to the second location selection signal 132. For example, as shown in FIG. 1, the second location selection signal 132 may be used by the online merchant system 108 to identify the second merchant location 128 as the merchant location from which to pick-up the ordered items or from which the ordered items should be delivered. Based on the second merchant location 128, in some examples, the online merchant system 108 may access a second merchant item inventory 134 and compare items identified for order in the item selection list 116 and/or the selected items list 124 with items in the second merchant item inventory 134. Based on this comparison, the online merchant system 108 may, in some examples, determine the items ordered by the user 102 that are available from the second merchant location 128, for example, based at least in part on the item selection list 116 and/or the selected items list 124 (possibly modified as noted above) and the second merchant item inventory 134. In some examples, as shown in FIG. 1, the online merchant system 108 may also access second merchant location information 136 relating to characteristics associated with the second merchant location 128, for example, as explained herein.

In some examples, once the items available from the second merchant location 128 have been identified, the online merchant system 108 may generate, based at least in part on the items available and/or unavailable, a second availability signal 138 indicative of the items unavailable from the item selection list 116 and/or the selected items list 124 (possibly modified as noted above) at the second merchant location 128. In some examples, the second availability signal 138 may include a signal indicative of items ordered from the first merchant location 114 not available at the second merchant location 128. For example, as shown in FIG. 1, the online merchant system 108 may send the second availability signal 138 via the network(s) 110 to the user device 104, and the user device 104 may provide the user 102 with information about the items unavailable from the second merchant location 128 for pick-up or delivery based at least in part on the second availability signal 138. For example, the user device 104 may display a user interface indicating the items available (e.g., available items 140 and/or items unavailable 142) from the order at the second merchant location 128. In some examples, the second availability signal 138 may also include suggested alternatives 144 (e.g., a suggested alternatives signal) indicative of item substitutes for one or more of the items unavailable 142 at the second merchant location 128.

In some examples, the second availability signal 138 may also include additional signals beyond the items available at the second merchant location 128. For example, the second availability signal 138 may include additional information related to the second merchant location 128 in the form of the second merchant location information 136. For example, the second merchant location information 136 may include one or more of (1) a second merchant characteristics signal indicative of characteristics related to the second merchant location 128, (2) a suggested alternatives 144 signal indicative of item substitutes for items from the plurality of items desired for purchase from the first merchant location 114 not available at the second merchant location 128, or (3) a locality information signal indicative of at least one attribute related to the second merchant location 128.

For example, the second merchant characteristics signal may include an indication that the second merchant location 128 includes one or more attributes that might be attractive to the user 102. For example, the one or more attributes may include one or more of a salad bar, a hot food bar, a prepared foods bar, a sushi bar, a sommelier, a wine bar, a cheese bar, a bakery, a seafood counter, a butcher counter, an olive bar, a juice bar, an international foods section, a floral department, a café, a pharmacy, an optometrist, financial services, etc.

In some examples, the second availability signal 138 may include a suggested alternatives 144 signal representative of alternatives to the ordered items that are unavailable at the second merchant location 128, the alternatives being items that are available at the second merchant location 128. For example, each of the items ordered for purchase from the first merchant location 114 may include one or more item characteristics including, for example, one or more of an item type (e.g., salmon, chicken, steak, bread, lettuce, cucumbers, apples, salt, etc.), an item origin (e.g., a particular farm, seafood supplier, geographic location, etc.), an item brand, an item quantity (e.g., 16 ounces, number of pieces, etc.), an item price, or other item characteristics not covered by the type, brand, origin, quantity/size, or price (e.g., organic, gluten free, non-GMO, etc.). In some examples, the suggested alternatives 144 signal may be indicative of item substitutes, and the item substitutes may include items having an item type in common with the items from the plurality of items desired for purchase from the first merchant location 114 not available at the second merchant location 128, and at least one of a different item origin, a different item brand, a different item quantity/size, a different item price, or other different characteristics.

In some examples, the second availability signal 138 may include a locality information signal indicative of at least one attribute related to the second merchant location 128. For example, the attribute related to the second merchant location 128 may include one or more of traffic information for a route between the user device 104 and the second merchant location 128, traffic conditions at the second merchant location 128, or weather conditions at the second merchant location 128. In some examples, the online merchant system 108 may be configured to receive information related to traffic and/or the weather from a third-party service.

In some examples, as explained herein, the user 102 may use the user device 104, which may display a user interface having a menu for selecting a merchant location from among a plurality of different merchant locations, to place the order for the items from the first merchant location 114 or the second merchant location 128, and to determine the items from the order that are available at one or more of those merchant locations. In some examples, the user 102 may use the user device 104 to select a third, a fourth, a fifth, etc., merchant location different from the first merchant location 114 and the second merchant location 128, and to determine the items from the order that are available at one or more of those merchant locations, for example, in a manner similar to the manner described with respect to the second merchant location 128 described above. As shown in FIG. 1, once the user 102 selects the merchant location for placing the order, the user device 104 may send a third signal 146 to the online merchant system 108 via the network(s) 110, and the online merchant system 108 may process the order, so that it may be picked-up or delivered from the selected merchant location. In some examples, the third signal 146 may include a purchase location selection signal 148, including a selected merchant location from which the user 102 would like to pick-up the order, or from which the user 102 would like the order delivered. In some examples, the third signal 146 may also include other information, such as, for example, information relating to the location at which the user 102 wants the ordered delivered, for example, the location of the user device 104 or an address entered by the user on the user device 104. In some examples, this may be a location associated with the user's preferences.

In some examples, the online merchant system 108 may receive the third signal 146 and process the order accordingly at the selected merchant location. In some examples, the online merchant system 108 may store data associated with the third signal 146 and/or the transaction, and use the stored information to improve the suggested alternatives 144 for each user 102 following the transaction. For example, a particular user 102 may never select certain alternatives, and thus, the online merchant system 108, over time, may not provide certain alternative item suggestions. Alternatively, or additionally, a particular user 102, if provided with a certain alternative, may always select that particular alternative. The online merchant system 108 may use such information to tailor the suggested alternatives 144 to specific users based on past user history and/or preferences in the user's profile.

In some examples, the online merchant system 108 may provide users with an ability to weight or bias the suggested alternatives 144 according to users' preferences. For example, a user 102 may be able to able to increase or decrease the level of importance of one or more of the item type, item origin, item brand, item quantity, or item price, such that the suggested alternatives 144 suggested by the online merchant system 108 are determined based at least in part on the relative weights or bias selected by the user 102. For example, a user may weight item type more heavily than item brand, for example, if the brand is relatively less important to the user 102. In another example, a user 102 may weight item price relatively more heavily than item brand or item origin. In this example manner, the online merchant system 108 may be able to provide users with an ability to affect the suggested alternatives 144 provided by the online merchant system 108 according to their preferences.

Figure 2:
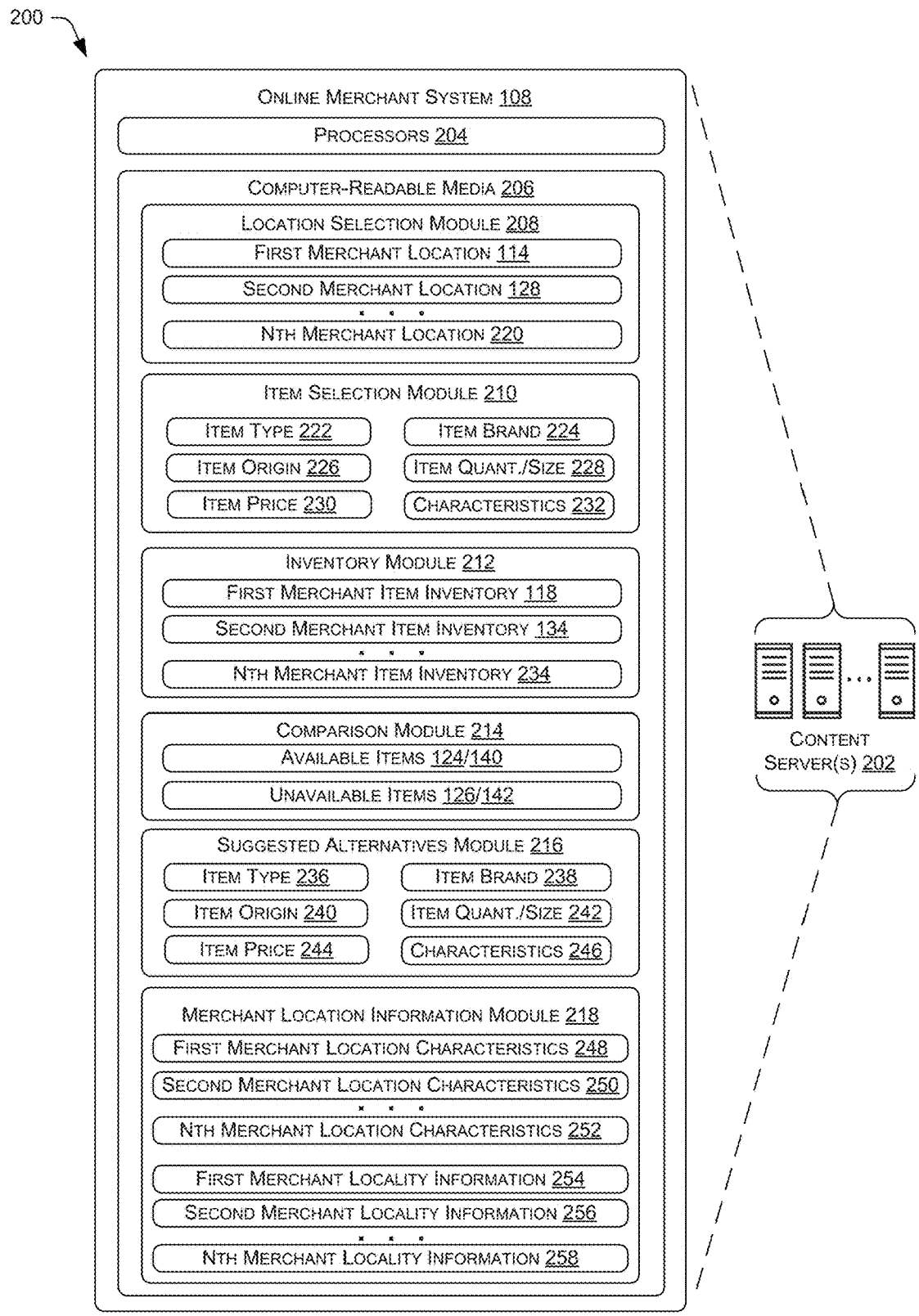
FIG. 2 illustrates an example system that receives an order for items from a first merchant location, determines the availability of the items at the first merchant location, receives an order for the items from a second merchant location, determines the availability of the items at the second merchant location, and provides a preview of the items available or unavailable at the second merchant location.

FIG. 2 illustrates an example system 200 that receives an order for items from the first merchant location 114, determines the availability of the items at the first merchant location 114, receives an order for the items from the second merchant location 128, determines the availability of the items at the second merchant location 128, and provides a preview of the items available or unavailable at the second merchant location 128. In the example shown in FIG. 2, the system 200 includes one or more content server(s) 202. As shown, the content server(s) 202 include the one or more processor(s) 204, computer-readable media 206, and one or more of a location selection module 208, an item selection module 210, an inventory module 212, a comparison module 214, a suggested alternatives module 216, or a merchant location information module 218.

The one or more processors 204 may execute the one or more of the above-noted modules and/or processes to cause the user device 104 and/or the content servers 202 to perform a variety of functions, as set forth above and explained in further detail herein. In some examples, the processor(s) 204 may include a central processing unit (CPU), a graphics processing unit (GPU), both CPU and GPU, or other processing units or components known in the art. Additionally, each of the processors 204 may possess its own local memory, which also may store program modules, program data, and/or one or more operating systems.

The computer-readable media 206 may include volatile memory (e.g., RAM), non-volatile memory (e.g., ROM, flash memory, miniature hard drive, memory card, or the like), or some combination thereof. The computer-readable media 206 may be non-transitory computer-readable media. The computer-readable media 206 may include, or be associated with the one or more of the above-noted modules, which perform various operations associated with the online merchant system 108, the user device(s) 104, and/or the content server(s) 202. In some examples, one or more of the above-noted modules may include or be associated with computer-executable instructions that are stored by the computer-readable media 206 and that are executable by the one or more processors 204 to perform such operations. The user device(s) 104, the online merchant system 108, and/or the content server(s) 202 may also include additional components not listed above that may perform any function associated with the user device(s) 104, the online merchant system 108, and/or the content server(s) 202.

In some examples, the location selection module 208 may be configured to determine the location from which the user 102 (e.g., a customer) would like to pick up one or more ordered items, or from which the user 102 would like to have the ordered items delivered. As shown in FIG. 2, the example location selection module 208 may include data related the first merchant location 114, the second merchant location 128, through the nth merchant location 220. The user 102 may cause the user device 104 to transmit the first signal 106 to the online merchant system 108 via one or more network(s) 110. As noted previously herein, the first signal 106 may include a first location selection signal 112 indicative of a merchant location from which the user 102 would like to pick up the ordered items or from which the user 102 would like the items delivered. In some examples, the first location selection signal 112 may result from the user 102 selecting the merchant location from a menu of available merchant locations provided on a user interface of the user device 104. In some examples, the location selection module 208 of the online merchant system 108 may be configured to provide such a user interface. In some examples, the user 102 may have an account with the online merchant system 108, including user preferences relating to merchant locations preferred by the user 102. In such examples, the first signal 106 may include the merchant location information, and the location selection module 208 may be configured to receive the merchant location information and identify the merchant location based at least in part on the merchant location information. In some examples, the location selection module 208 of the online merchant system 108 may be configured to select the first merchant location 114 based on the first signal 106, which may include an indication of the location of the user device 104.

In some examples, the system 200 may include the item selection module 210. In such examples, the first signal 106 from the user device 104 may include the item selection list 116 indicative of a plurality of items desired for purchase from the selected merchant. In some examples, the item selection module 210 of the online merchant system 108 may provide a menu of items on the user device 104 from which the user 102 may choose to order, and the user 102 may use the menu to select the items desired for order. In some examples, the item selection module 210 may include data related to item type 222, item brand 224, item origin 226, item quantity/size 228, item price 230, and/or other item characteristics 232 not covered by the type, brand, origin, quantity/size, or price (e.g., organic, gluten free, non-GMO, etc.). In some examples, the user 102 may have an account with the online merchant system 108, and the item selection module 210 of the online merchant system 108 may provide the user 102 with an ability to create an item list (e.g., a virtual shopping cart) that the user 102 may use to facilitate ease of ordering, for example, as described above.

As shown in FIG. 2, in some examples, the system 200 may include an inventory module 212 configured to provide a list of all the items available from a particular merchant location. For example, after the online merchant system 108 receives the first signal 106 from the user device 104, the location selection module 208 may identify the merchant location selected by the user 102, and the item selection module may identify the items ordered by the user 102. Thereafter, in some examples, the online merchant system 108 may access an item inventory for the selected merchant location. For example, as shown in FIG. 2, the inventory module 212 includes a first merchant item inventory 114 for a first merchant location 114, a second merchant item inventory 122 for a second merchant location 128, through an nth merchant item inventory 234 for an nth merchant location 220. Based at least in part on the merchant location selected by the user 102, the online merchant system 108, using the inventory module 212, may access the merchant item inventory corresponding to the selected merchant location, which may provide data associated with all the items available from the selected merchant location.

In some examples, the merchant item inventory for a respective merchant location may be created and/or maintained by periodic manual inspection by individuals at the respective merchant locations, and/or by automated operation. For example, individuals at a merchant location may periodically take inventory (e.g., observe which and/or how many of a given item are present on the shelves and/or in storage at the merchant location). In some examples, this may be supplemented by information obtained from a point-of-sale tracking system, for example, such that as items are purchased, the removal of the item from the merchant item inventory for that particular merchant location is recorded. In some examples, as items are delivered by a supplier (e.g., a distributor of the item) to the merchant location, the presence of those items may be added to the merchant item inventory. In some examples, as items are ordered from a supplier, they may be provisionally added to the merchant item inventory for the given merchant location, and the provisional addition may be confirmed upon receipt of the delivery by the supplier. In this example manner, the online merchant system 108 may maintain and update the merchant item inventory for respective merchant locations in an at least partially automated manner. In some examples, this may, in turn, be supplemented by manual inspection on a periodic basis (e.g., on a regularly scheduled basis). For example, an individual may check the availability of a sample of items daily or overnight and record the results of the check.

As shown in FIG. 2, some examples of the system 200 may include a comparison module 214. In some examples, the comparison module 214 of the online merchant system 108 may be configured to compare the items ordered by the user 102 with the merchant item inventory identified by the inventory module 212 and identify whether the ordered items are available or unavailable from the selected merchant location. For example, as shown in FIG. 2, the example comparison module 214 may identify available items 140 and/or unavailable items 126/142 from the selected merchant location. In some examples, as noted above, based at least in part on the identified available items 140 and/or unavailable items 126/142, the online merchant system 108 may be configured to transmit an availability signal (e.g., the first availability signal 122 and the second availability signal 138) via the network(s) 110 to the user device 104, so that the user 102 may be advised of the availability and/or unavailability of the ordered items from the selected merchant location.

As shown FIG. 2, some examples of the system 200 may include a suggested alternatives module 216. In some examples, based at least in part on the selected items list 124 and/or unavailable items 126/142, the suggested alternatives module 216 may be configured to identify items available in the selected merchant's item inventory that might be acceptable substitutes for the unavailable items 126/142. For example, the suggested alternatives module 216 may include data related to one or more of the item type 236, item brand 238, item origin 240, item quantity/size 242, item price 244, or other item characteristics 246 of the items in the selected merchant's item inventory, and the suggested alternatives module 216 may be configured to select one or more suggested alternatives 144 for the ordered items unavailable from the selected merchant. In some such examples, the online merchant system 108 may be configured to transmit a suggested alternatives 144 signal via the network(s) 110 to the user device 104 indicative of item substitutes, for example, as described herein.

For example, a user 102 may select a particular item available at one merchant location, and the same item is not available at a second merchant location. Items may be identified with one or more item characteristics, such as an item type (e.g., blueberries), an item brand (e.g., Bluebell Blueberries®), an item origin (e.g., blueberries from southern California), an item quantity/size (e.g., one pint), an item price (e.g., $3.50 per pound), or another characteristic (e.g., organic blueberries). The user 102 may select an item having such item characteristics, and the second merchant location may not have an exactly matching item. In such situations, the online merchant system 108 may suggest one or more alternative items based at least in part on one or more of those item characteristics. For example, if a user 102 selects the example blueberries item described above, the online merchant system 108 may suggest one or more blueberry items having similar item characteristics. For example, the suggested alternatives 144 may include blueberries of a different brand, but with other item characteristics that are similar. For example, the suggested alternatives 144 may include organic blueberries from southern California having similar item characteristics. In another example, the suggested blueberries may have the same item brand, but have a different item quantity and/or price.

As noted previously, in some examples, the online merchant system 108 may be configured to store data associated with the user's alternative-related preferences, and use the stored information to improve the suggested alternatives 144 for each user. For example, a particular user may never select certain alternatives, and thus, the online merchant system 108, over time, may not provide certain alternative item suggestions. Alternatively, or additionally, a particular user, if provided with a certain alternative, may always select that particular alternative. The online merchant system 108 may use such information to tailor the suggested alternatives 144 to specific users based on past user history and/or preferences in the user's profile.

In some examples, as shown in FIG. 2, the system 200 may include a merchant location information module 218, which may include one or more of merchant location characteristics associated with one or more of the merchant locations and/or merchant locality information associated with one or more of the merchant locations. For example, the merchant location characteristics may include information related to attributes of a merchant location, for example, whether the merchant location includes a salad bar, a hot food bar, a prepared foods bar, a sushi bar, a sommelier, a wine bar, a cheese bar, a bakery, a seafood counter, a butcher counter, an olive bar, a juice bar, an international foods section, a floral department, a café, a pharmacy, an optometrist, and/or financial services. The merchant locality information may include information related to one or more of traffic information for a route between the user device 104 and the second merchant location 128, traffic conditions at the second merchant location 128, or weather conditions at the second merchant location 128. In the example shown in FIG. 2, the merchant location information module 218 includes first merchant location characteristics 248 and second merchant location characteristics 250 through nth merchant location characteristics 252, and first merchant locality information 254 and second merchant locality information 256 through nth merchant locality information 258.

Figure 3:
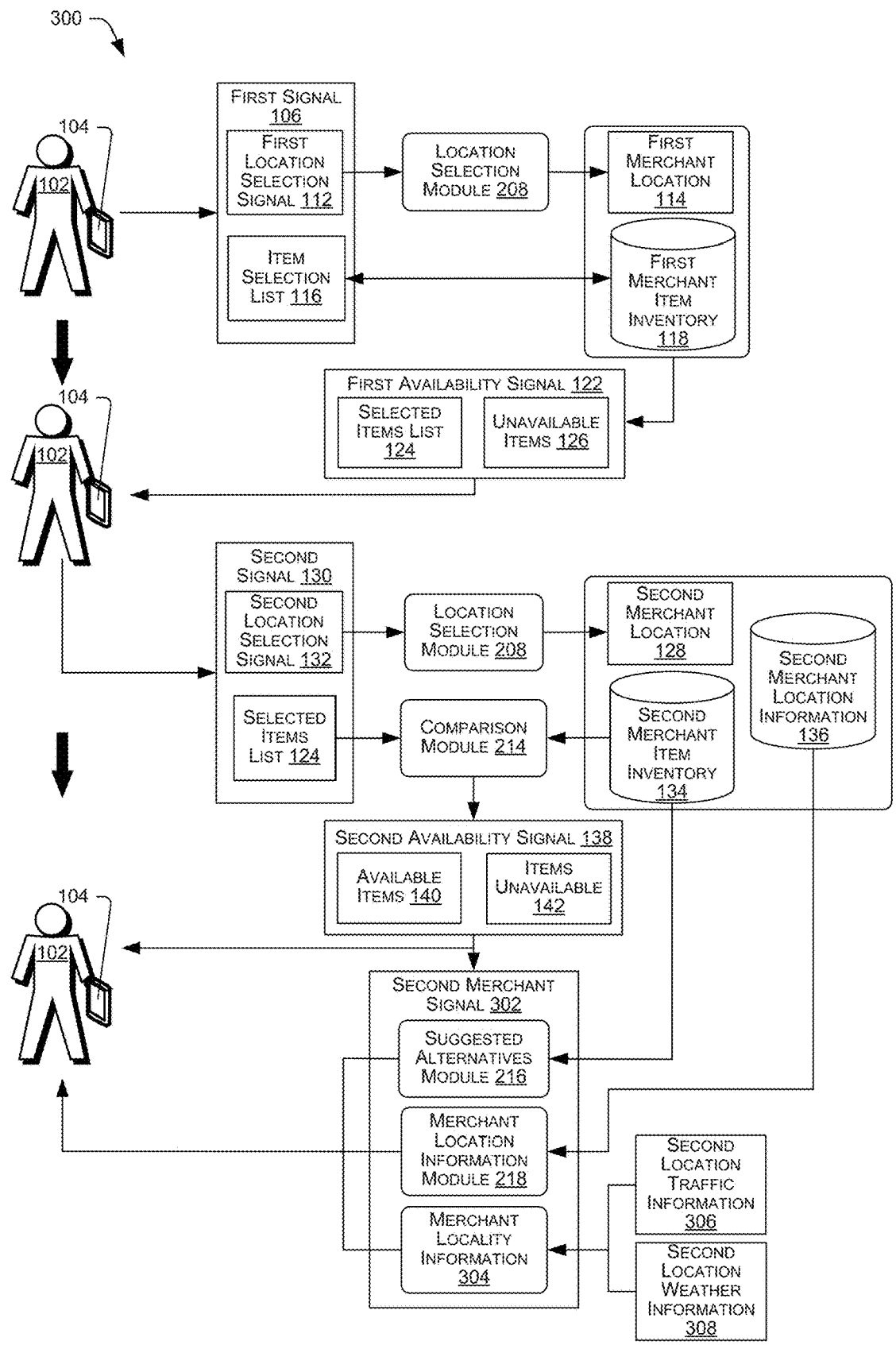
FIG. 3 illustrates an example flow of information between a customer and an example online merchant system relating to a request for items from a first merchant location and a second merchant location.

FIG. 3 illustrates an example flow 300 of information between the user 102 (e.g., a customer) using an example user device 104 and the example online merchant system 108. As shown in FIG. 3, the user 102 may use the example user device 104 to send the first signal 106, including, in some examples, the first location selection signal 112 and/or the item selection list 116. Upon receipt, the location selection module 208, based at least in part on the first location selection signal 112, may identify the first merchant location 114 and access information associated with the first merchant location 114, such as, for example, the first merchant item inventory 118, which may be stored as a database in the computer-readable media 206.

As noted above, the user may send a second signal 130 including the second location selection signal 132 and/or the item selection list 116 to the online merchant system 108 using the user device 104, for example, to determine whether a different (e.g., user-selected) merchant location (e.g., the second merchant location 128) has one or more of the first items available. In some examples, the items identified in the first item signal may be modified relative to the item selection list 116 sent with the first signal 106. Upon receipt of the second signal 130, the location selection module 208, based at least in part on the second location selection signal 132, may identify the second merchant location 128 and access information associated with the second merchant location 128, such as, for example, the second merchant item inventory 134, which may be stored as a database in the computer-readable media 206. In some examples, the comparison module 214 may receive both the item selection list 116 and a signal from the second merchant item inventory 134, and compare the items included in the item selection list 116 and items in the second merchant item inventory 134 to determine the items available (e.g., the items available and/or unavailable) at the second merchant location 128. Based on the comparison, the online merchant system 108 may send a second availability signal 138, including the available items 140 and/or the items unavailable 142, to the user device 104, so that the user 102 may be informed of the items available and/or unavailable from the second merchant location 128.

In some examples, as shown in FIG. 3, the online merchant system 108 may also send a second merchant signal 302 that may include information related to one or more of (1) suggested alternatives 144 of item substitutes for items from the plurality of items desired for purchase from the first merchant location 114 not available at the second merchant location 128, (2) second merchant location information including, for example, characteristics related to the second merchant location 128, or (3) a locality information signal indicative of at least one attribute related to the second merchant location 128. The suggested alternatives module 216 may access the second merchant item inventory 134 and identify suggested alternatives 144 for items that are unavailable from the second merchant location 128.

In some examples, the second availability signal 138 may include a suggested alternatives 144 signal representative of alternatives to the ordered items that are unavailable at the second merchant location 128. As shown in FIG. 3, the suggested alternatives module 216 may access the second merchant item inventory 134 to determine alternative items available at the second merchant location 128. Once determined, a suggested alternatives 144 signal may be sent to the user device 104 so the user may consider, and if desired by the user 102, order one or more of the suggested alternatives 144, for example, as described herein.

In some examples, the online merchant system 108 may include a merchant location information module 218 configured to access second merchant location information 136 and identify location characteristics associated with the second merchant location 128. For example, the second merchant characteristics may include an indication that the second merchant location 128 includes one or more attributes that might be attractive to the user 102. For example, the one or more attributes may include one or more of a salad bar, a hot food bar, a prepared foods bar, a sushi bar, a sommelier, a wine bar, a cheese bar, a bakery, a seafood counter, a butcher counter, an olive bar, a juice bar, an international foods section, a floral department, a café, a pharmacy, an optometrist, or financial services. The online merchant system 108 may send a merchant location information signal, including the merchant location characteristics to the user device 104, so that the user 102 may consider the information when selecting a merchant location from which to pick up the order items or to have the ordered items delivered.

In some examples, the second merchant signal may also include merchant locality information 304 including information related to at least one attribute related to the geographic location of the second merchant location 128. For example, the attribute related to the second merchant location 128 may include second location traffic information 306, for example, for a route between the user device 104 and the second merchant location 128 and/or traffic conditions at the second merchant location 128 (e.g., at a time period relevant to the time at which the user would like to pick-up the ordered items). In some examples, the attribute related to the second merchant location 128 may include second location weather information 308 indicative of weather conditions at the second merchant location 128. In some examples, the online merchant system 108 may be configured to receive information related to traffic and/or the weather from a third-party service. The online merchant system 108 may send such information to the user device 104, so that the user 102 may consider the information when selecting a merchant location from which to pick up the ordered items or to have the ordered items delivered.

Figure 4:
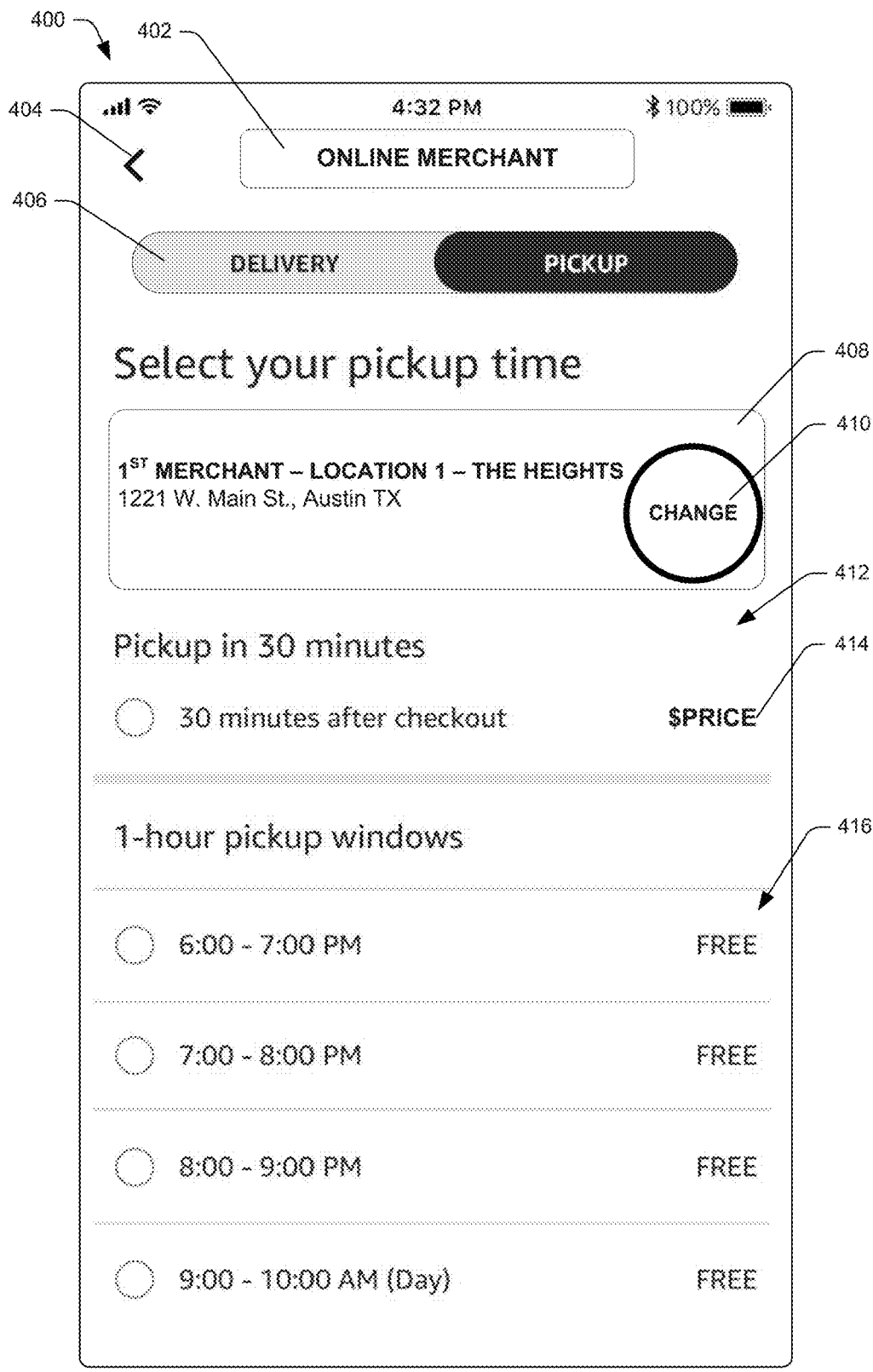
FIG. 4 illustrates an example user interface (UI) for placing an example order from a first merchant at a first location.

FIGS. 4-10 illustrate interface diagrams showing example configurations for a human-machine interface for ordering items from different merchant locations using an example online merchant system 108. FIG. 4 illustrates an example user interface (UI) 400 for providing a user with options for ordering items for pick-up or delivery from one or more merchant locations. Although any configuration or layout of the UI is contemplated herein, the example UI 400 shown in FIG. 4 includes a banner 402 indicating the name of the merchant ("Online Merchant") and adjacent the banner, a back selector 404 for enabling the user to return to the previous screen. Below the banner 402, the example UI 400 includes a selector 406 in the form of an example slider enabling the user to select that the items ordered from the online merchant system 108 are for pick-up or delivery. In the example shown, the selector 406 is in the "Pickup" position. In the example shown, because the pickup option has been selected, below the selector 406 the example UI 400 includes a pickup location area 408 showing the merchant location at which the ordered items may be pick-up. In the example shown, the pickup location area 408 advises the user that the currently selected pick-up location is the "$1^{st}$ Merchant—Location 1—The Heights" at "1221 W. Main St., Austin, Tex." The example pickup location area 408 also provides an option for the user to change locations by selecting the "Change" button 410, as explained herein. Below the pickup location area 408, the example UI 400 includes a pickup time selection area 412, which provides several time options from which the user may select for picking up the items from the first merchant location. In the example shown, the user may choose, for a fee, to pick-up the items within thirty minutes from placing the order at 414. Alternatively, the example UI 400 shown permits the user to choose to pick-up the items during several one-hour pickup windows 416 free of charge.

Figure 5:
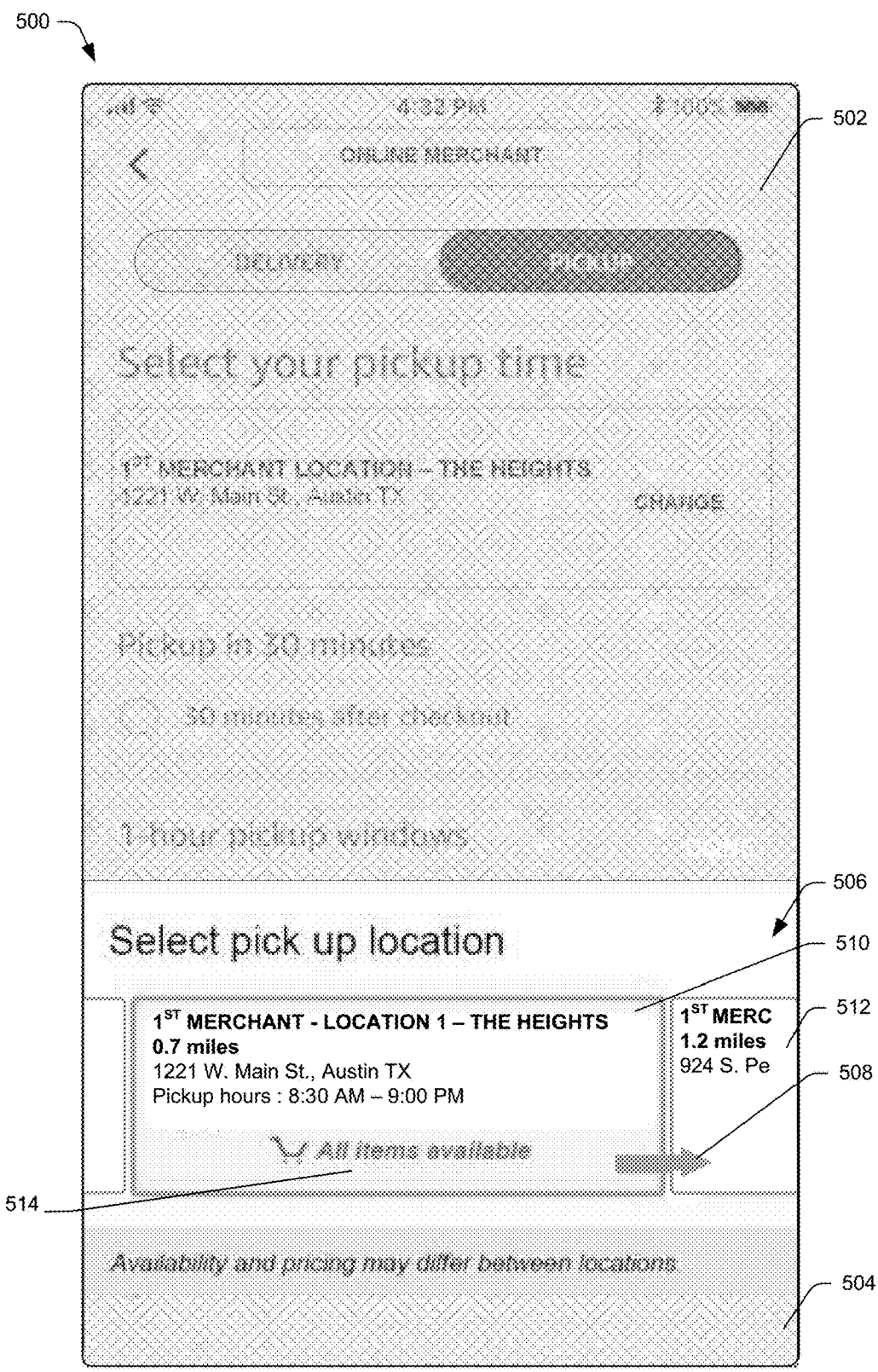
FIG. 5 illustrates an example UI for selecting from among an example choice of merchant locations for picking up an order or from which an order may be delivered.
Figure 6:
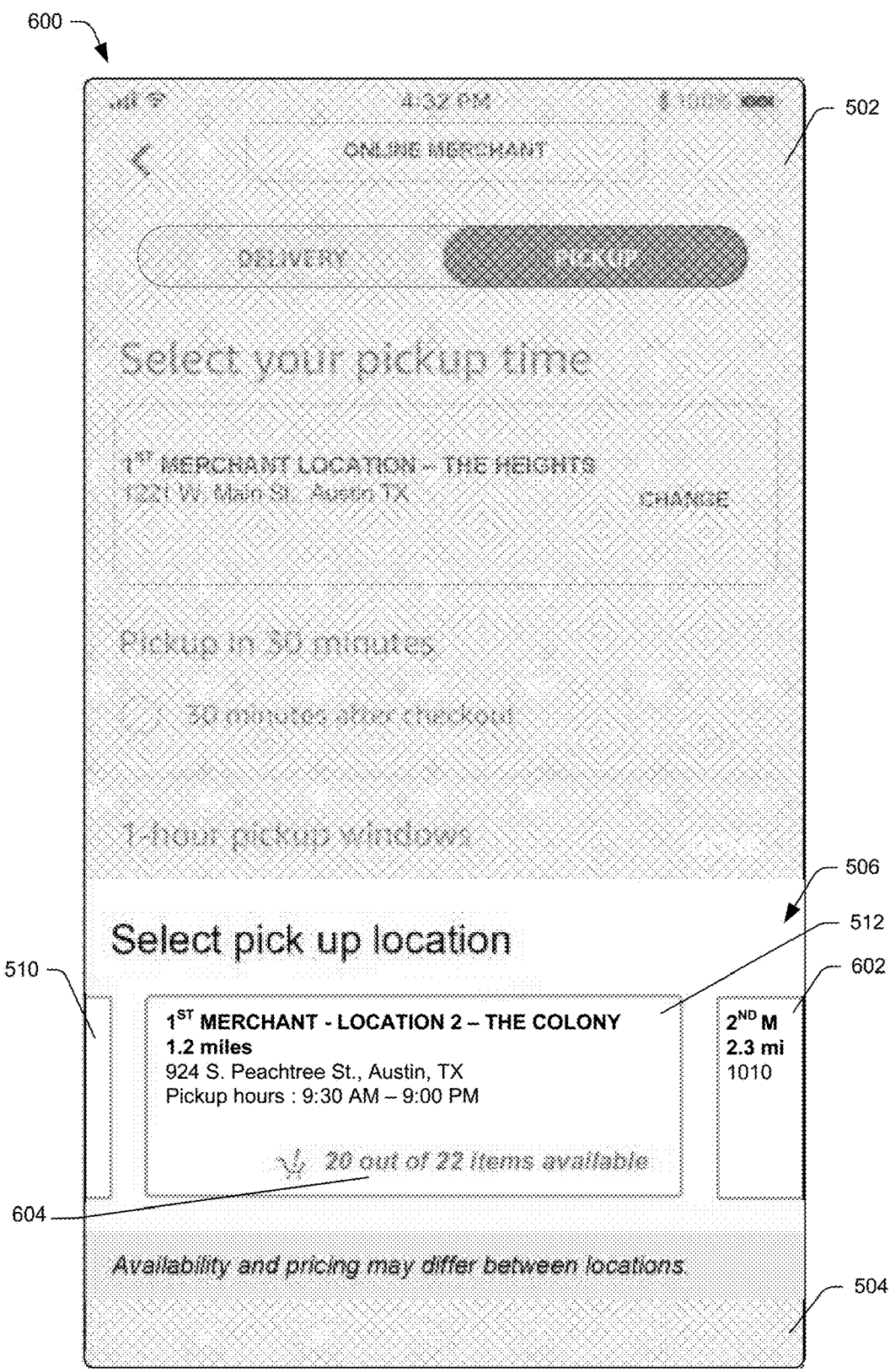
FIG. 6 illustrates an example UI for selecting an example first merchant at a second location for picking up an order or from which an order may be delivered.

FIG. 5 illustrates an example UI 500 following selection of the Change button 410 shown in FIG. 4. By selecting the Change button 410, the user is able to change the location from the first merchant location to another merchant location from which the user orders the items for pickup or delivery. In the example shown in FIG. 5, an example upper area 502 and an example lower area 504 of the UI 500 have been disabled from operation by the user, and are depicted as being shaded to indicate to the user that these portions of the UI 500 are inactive. Between the upper area 502 and lower area 504, the example UI 500 includes a pickup location selection area 506, which enables the user to select a merchant location from among a plurality of merchant locations from which to pick-up the ordered items. If the user had selected "Delivery" using the selector 406 shown in FIG. 4, in some examples, a delivery location selection area may be provided instead of the pickup location selection area 506. In the example shown, the pickup location selection area 506 provides a scrollable list of locations from which the user may pick-up the ordered items. For example, the pickup location selection area 506 shown in FIG. 5 includes an arrow 508 to advise the user to swipe the pick-up selection area 506 from left-to-right or right-to-left across the screen to show merchant location options from which the ordered items may be picked-up. In the example shown, the "$1^{st}$ Merchant—Location 1" is visible in the form of a location block 510, and a leading edge of the "$1^{st}$ Merchant—Location 2" is visible in the form of a location block 512. In this example, the $1^{st}$ Merchant at Location 1 is commonly-owned and/or affiliated with a common chain of stores relative to Merchant 1 at Location 2 (e.g., the $1^{st}$ Merchant represents a common chain of stores and the "Location 1" and "Location 2" designations indicate they are located at different geographic locations). By swiping the scrollable list right-to-left as shown, the user may bring the merchant options and/or location options into view in the pickup location selection area 506, for example, as shown in FIG. 6. In some examples, the user may use the pickup location selection area 506 to provisionally select the merchant location from which to pick-up the ordered items (or from which to have the ordered items delivered) by touching or selecting the location block displaying the merchant location (e.g., the "1$^{st}$ Merchant—Location 1" by selecting the location block 510, or the "1$^{st}$ Merchant—Location 2" by selecting the location block 512). In some examples, the UI 500 may include an availability indicator 514 showing the availability of the desired items from the displayed location. For example, the example availability indicator 514 shown in FIG. 5 indicates that all the desired items (e.g., from the item selection list 116 described herein) are available by displaying "All items available."

FIG. 6 illustrates an example UI 600 following an example right-to-left swiping by the user of the scrollable list. As shown, the location block 512 corresponding to the "1$^{st}$ Merchant—Location 2—The Colony" is fully visible in the pickup location selection area 506. In addition, a leading edge of a location block 602 corresponding to the "2$^{nd}$ Merchant—Location 1" is visible. By continuing to swipe the scrollable list right-to-left as shown, the user may bring additional merchant options and/or location options into view in the pickup location selection area 506. In some examples, the example the UI 600 may include an availability indicator 604 showing the relative availability of the desired items from the displayed location. For example, the example availability indicator 604 shown in FIG. 6 indicates that of the desired items (e.g., the items from the selected items list 124), 20 out of 22 of those items are available by displaying "20 out of 22 items available." For example, the selected items list 124 may correspond to a virtual shopping cart including all the items selected from the 1$^{st}$ Merchant at Location 1. The availability indicator 604 may display the number of items available from the 1$^{st}$ Merchant at Location 2 relative to the items in the virtual shopping cart.

Figure 7:
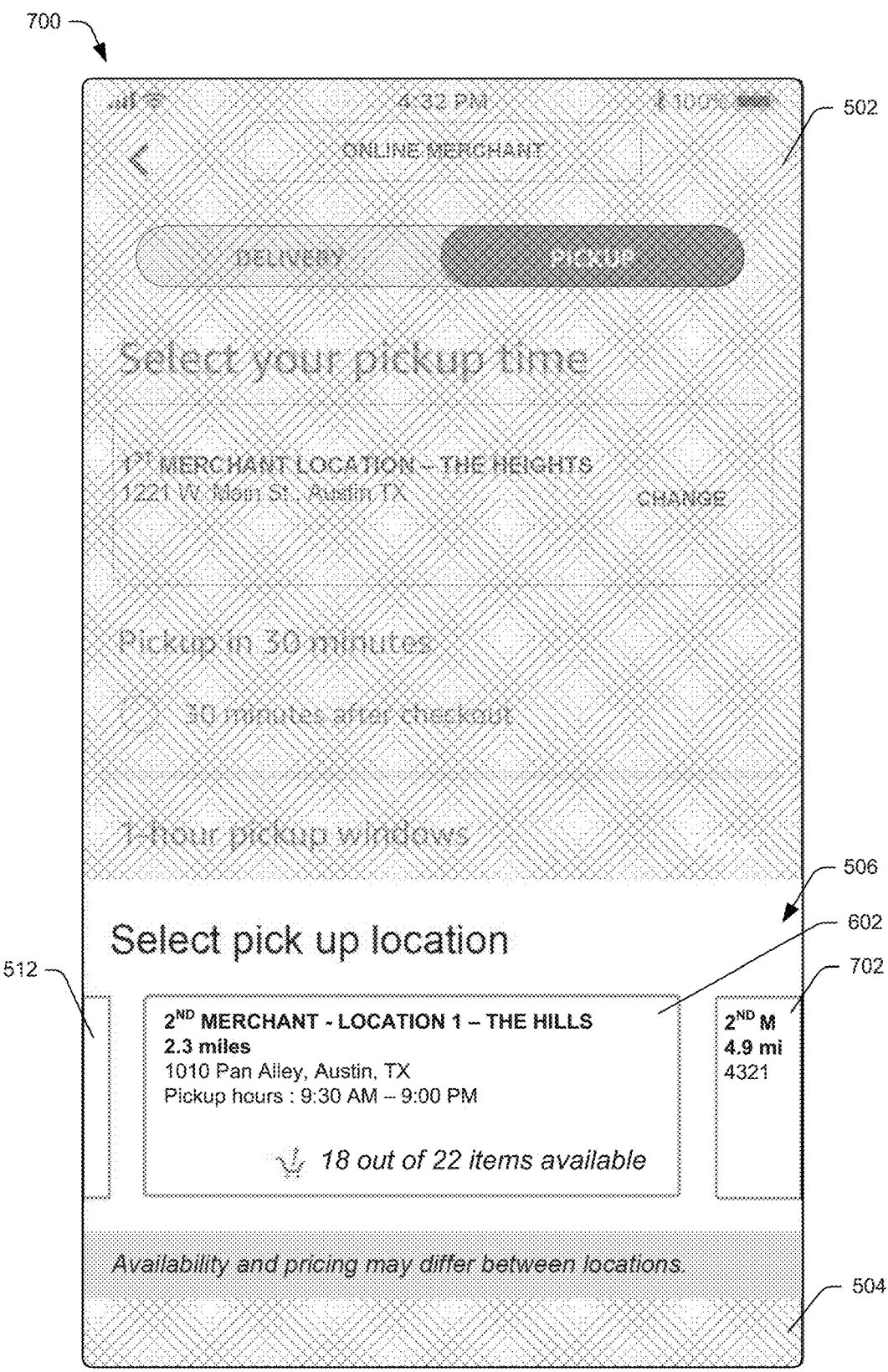
FIG. 7 illustrates an example UI for selecting an example second merchant at a first location of the second merchant for picking up an order or from which an order may be delivered.

FIG. 7 illustrates an example UI 700 for selecting an example second merchant at a first location of the second merchant for picking up an order, or from which an order may be delivered, for example, following an example right-to-left swiping by the user 102 of the scrollable list. As shown, the location block 602 corresponding to the "2$^{nd}$ Merchant—Location 1—The Hills" is fully visible in the pickup location selection area 506. In addition, a leading edge of a location block 702 corresponding to the "2$^{nd}$ Merchant—Location 2" is visible. In this example, the 1$^{st}$ Merchant and the 2$^{nd}$ Merchant are owned and/or affiliated with different owners and/or different chains of stores (e.g., "1$^{st}$ Merchant" represents a first chain of stores and "2$^{nd}$ Merchant" represents a second chain of stores). In this example "Location 1" represents a first location of the 2$^{nd}$ Merchant, which, in this example, has a different geographic location than the Location 1 of the 1$^{st}$ Merchant, as indicated by their different respective addresses. In some examples, Location 1 of both the 1$^{st}$ Merchant and the 2$^{nd}$ Merchant may be similar (e.g., they may be located in a common shopping area, such as, for example, a common strip mall or a common shopping center). In some examples, the example the UI 700 may include an availability indicator 704 showing the relative availability of the desired items from the 2$^{nd}$ Merchant at Location 1. For example, the example availability indicator 704 shown in FIG. 7 indicates that of the desired items (e.g., the items from the selected items list 124), 18 out of 22 of those items are available by displaying "18 out of 22 items available."

Figure 8:
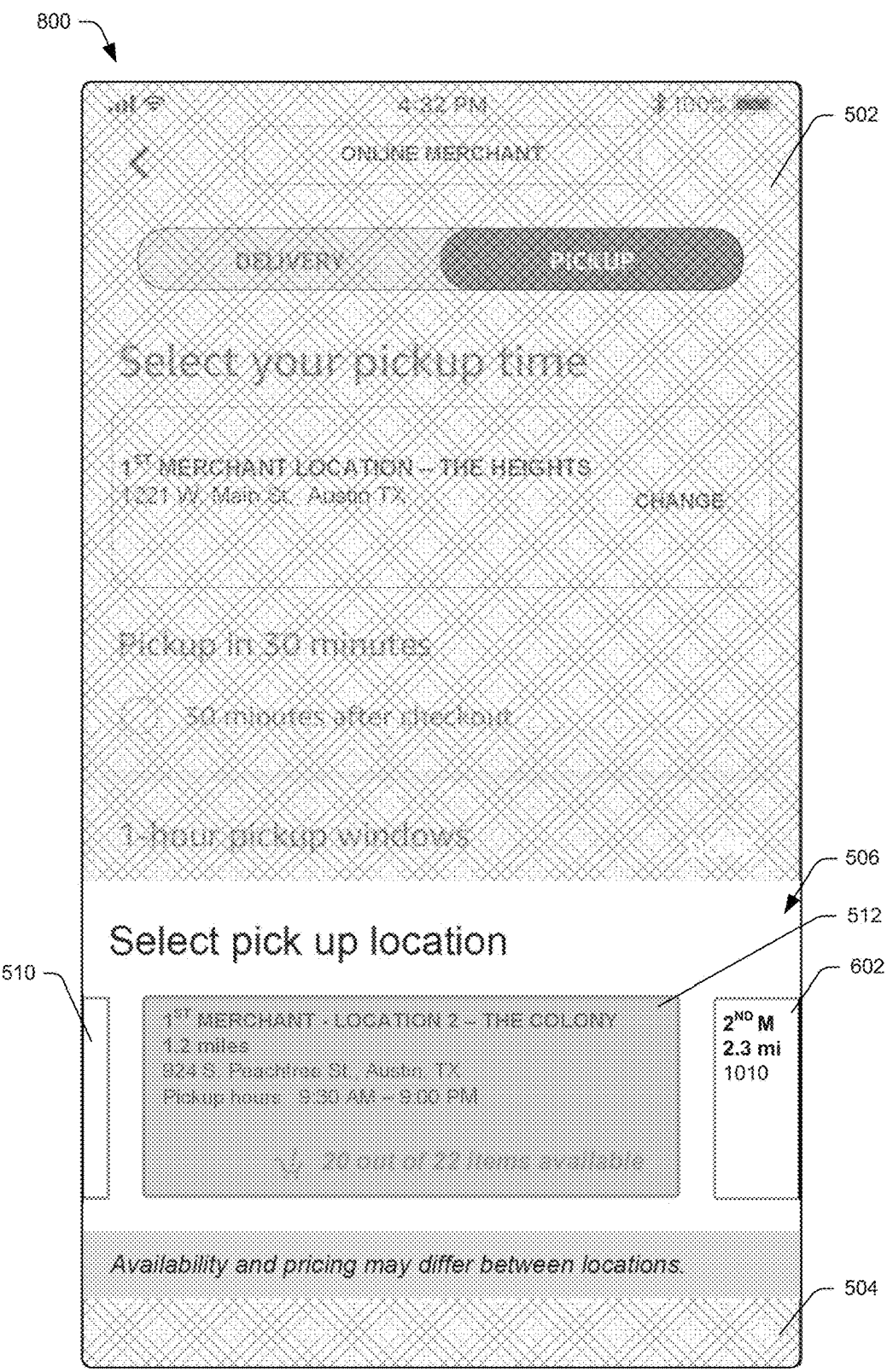
FIG. 8 illustrates an example UI for selection of the example second location of the first merchant shown in FIG. 6.

FIG. 8 illustrates an example UI 800 following selection of the location block 512 corresponding to the "1$^{st}$ Merchant—Location 2" as the merchant and location from which to pick-up the ordered items. In the example shown, once selected, the location block associated with the selected merchant and location (i.e., the location block 512 corresponding to the "1$^{st}$ Merchant—Location 2") is highlighted to indicate its selection.

Figure 9:
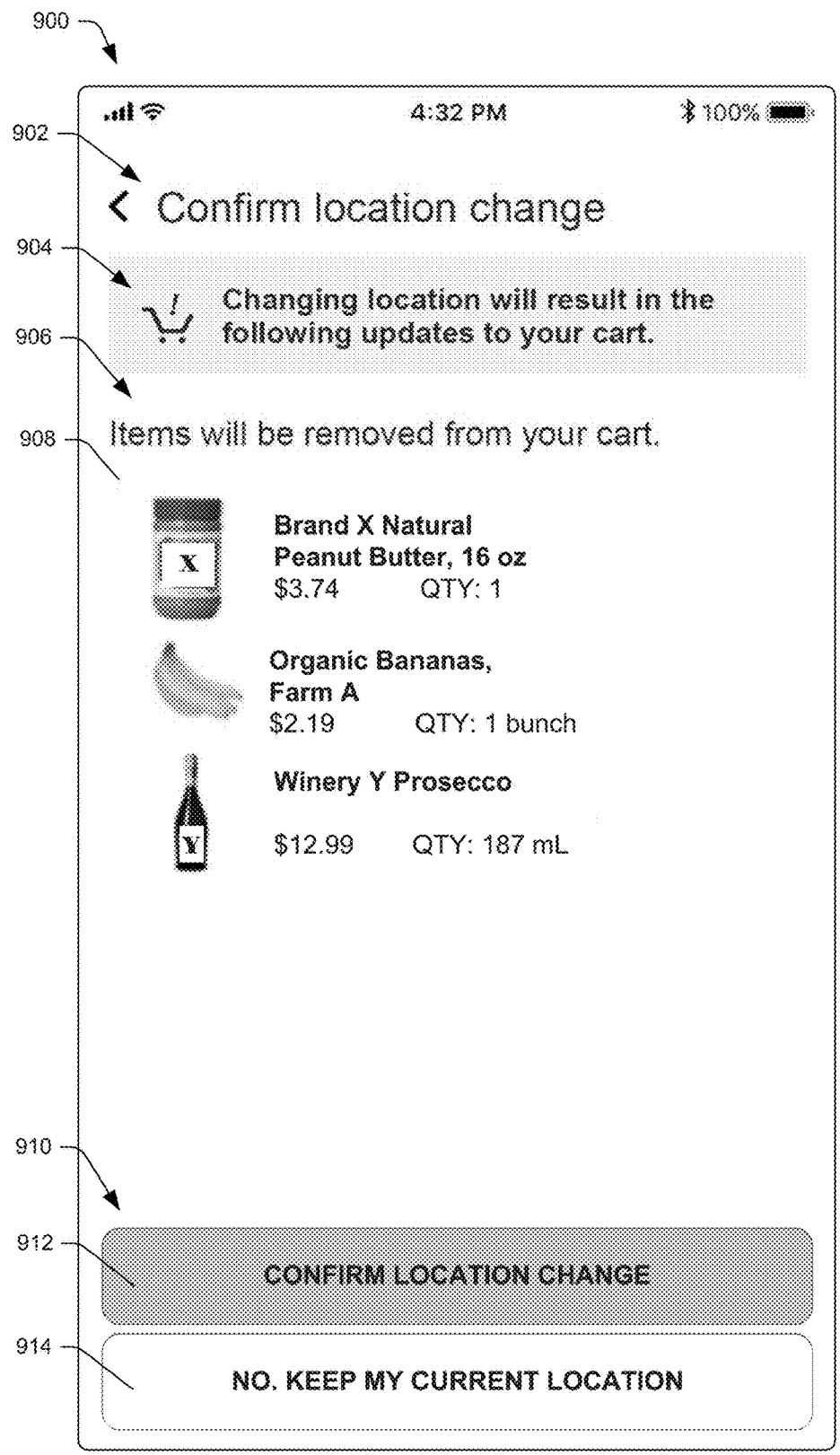
FIG. 9 illustrates an example UI showing an example preview of items available from the first merchant at the first location but unavailable from the first merchant at the second merchant location.

FIG. 9 illustrates an example UI 900 following selection of the location block 512 corresponding to the "1$^{st}$ Merchant—Location 2." The example UI 900 shown in FIG. 9 includes a confirmation selector 902 for enabling the user to confirm the selection of the "1$^{st}$ Merchant—Location 2" as the merchant and location for picking up the ordered items. The example UI 900 also includes a notification area 904 for advising the user that one or more of the ordered items are not available from the selected merchant and location (i.e., the "1$^{st}$ Merchant—Location 2"). In some examples, the items not available may be based at least in part on the second availability signal 138 described herein (see FIGS. 1 and 3), which may include available items 140 and/or items unavailable 142 determined, for example, by the comparison module 214 (see FIG. 2). As shown in FIG. 9, the example UI 900 may also include an available items area 906, which provides a list of items from the ordered items that are available and/or unavailable. For example, as shown in FIG. 9, the available items area 906 provides a list of unavailable items 908 corresponding to ordered items that are not available from the "1$^{st}$ Merchant—Location 2" (e.g., "Brand X Natural Peanut Butter," "Organic Bananas, Farm A," and "Winery Y Prosecco"). The example UI 900 shown in FIG. 9 also includes a confirmation area 910 providing the user with an option to either (1) confirm the change from ordering the items for pick-up from a previously selected merchant and location to ordering the items (not including the listed the unavailable items) from the "1$^{st}$ Merchant—Location 2" (by selecting a "Confirm Location Change" selector 912), or (2) decline making such a change, such that the items are ordered for pick-up from the previously selected merchant location (by selecting a "No. Keep My Current Location" selector 914), or by provisionally selecting a third, fourth, fifth, etc., merchant and/or location from which to order the items.

By providing the user with the list of available and/or unavailable items, some examples of the online merchant system 108 provide the user with information about any ordered items that are not available from the selected merchant location. This may prevent or reduce the likelihood that a user will select a merchant location for placing the order without knowing that one or more items from the order are unavailable from the selected merchant location. This may provide the user with an opportunity to consider the unavailability of some items when selecting the merchant location. In some examples, as described herein, the online merchant system 108 may also provide the user with one or more of suggested alternatives 144 for the unavailable items that are available at the provisionally selected merchant location, characteristics of the provisionally selected merchant location, or locality information to the provisionally selected merchant location (See FIGS. 1-3)

Figure 10:
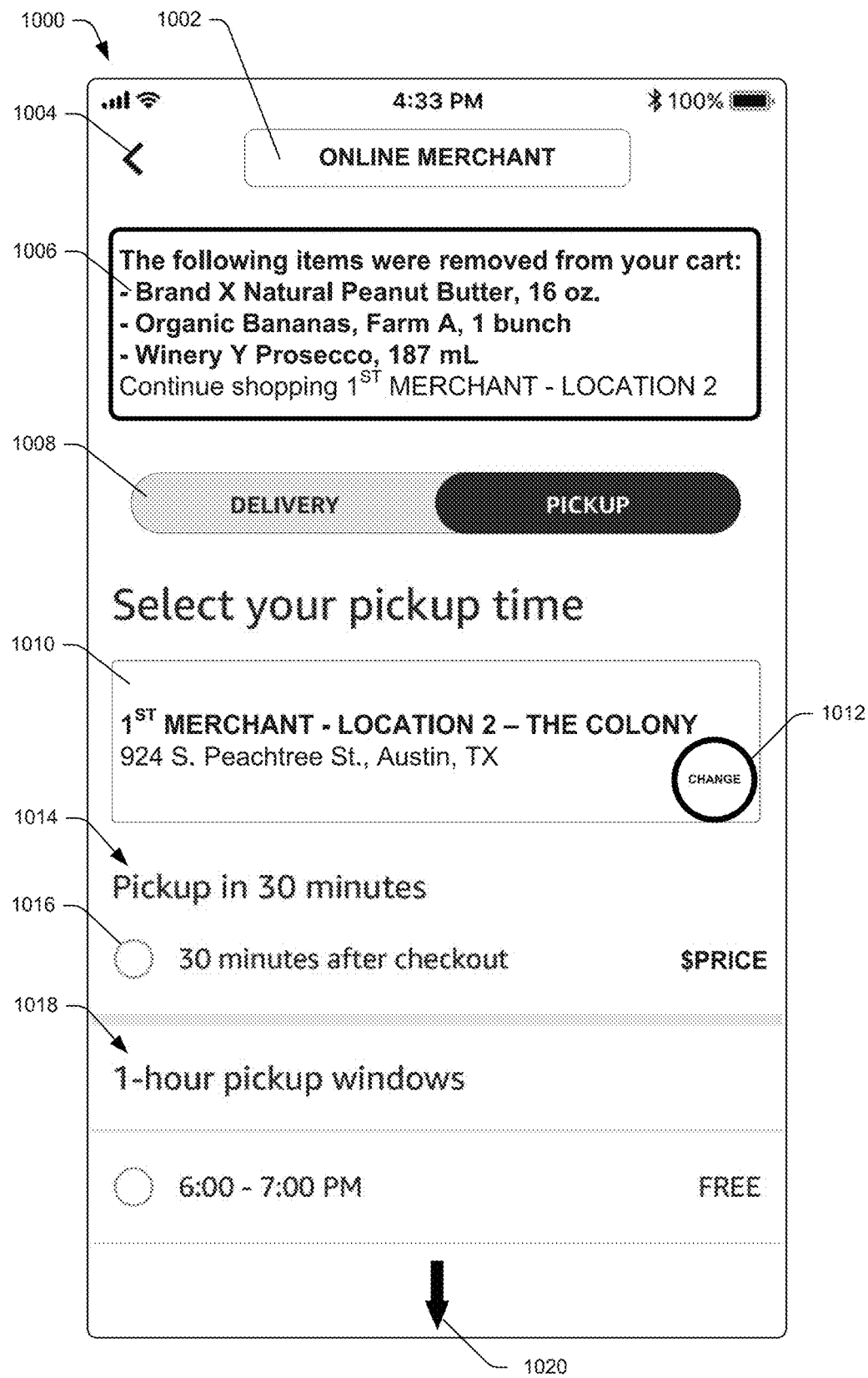
FIG. 10 illustrates an example UI showing an example of selection of the second location of the first merchant and indication of removal of unavailable items from the order.

As shown in FIG. 9, the "Confirm Location Change" selector 912 has been selected, as illustrated by highlighting of the "Confirm Location Change" selector 912. As illustrated in FIG. 10, once the "Confirm Location Change" selector 912 has been selected by the user, the example UI 1000 provides the user with information related to the selection. The example UI 1000 includes a banner 1002 indicating the name of the merchant ("Online Merchant") and adjacent the banner 1002, a back selector 1004 for enabling the user to return to the previous screen. Below the banner 1002, the example UI 1000 includes a message/ selection block 1006 indicating to the user that the items unavailable from the selected merchant location have been removed from the order (e.g., removed from the cart), and providing the user with an ability to select additional items from the selected merchant location by contacting or selecting the message/selection block 1006. For instance, the message/selection block 1006 indicates that "Brand X Natural Peanut Butter, 16 oz.," "Organic Bananas, Farm A," and "Winery Y Prosecco" have been removed from the user's 102 shopping cart, and further indicates that the user 102 has the option of continuing to shop at the same merchant location, possibly to search for and/or identify items that would serve as substitutes for the removed items. By contacting/selecting the message/selection block 1006, the user 102, in some examples, may be provided with a UI providing menus for selecting additional items to add to the previously ordered items.

In addition, the example UI 1000 shown in FIG. 10 also includes a selector 1008 in the form of an example slider enabling the user to select that the ordered items will be picked-up or delivered. In the example shown, the selector 1008 is in the "Pickup" position. In the example shown, because the pickup option has been selected, below the selector 1008 the example UI 1000 includes a pickup location area 1010 showing the merchant location at which the ordered items may be picked-up. In the example shown, the pickup location area 1010 advises the user that the currently selected pick-up location is the "1$^{st}$ Merchant—Location 2—The Colony" at "924 S. Peachtree St., Austin, Tex." The example pickup location area 1010 also provides an option for the user to change locations by selecting the "Change" button 1012, as explained herein. Below the pickup location area 1010, the example UI 1000 includes a pickup time selection area 1014, which provides several time options from which the user may select for picking up the items from the selected merchant location. In the example shown, the user may choose, for a fee, to pick-up the items within thirty minutes from placing the order at 1016. Alternatively, the example UI 1000 shown permits the user to choose to pick-up the items during several one-hour pickup windows 1018, including an arrow 1020 indicating that the user may scroll down to see additional pick-up time options.

As explained herein, some examples of the online merchant system 108 may provide suggested alternatives including item substitutes for items unavailable at a selected merchant location. The suggested alternatives may be generated according to any of the example techniques described herein or in similar ways. The example UI 900 shown in FIG. 9 provides a "Confirm Location Change" selector 912 permitting the user 102 to confirm the change of merchant locations to the "1$^{st}$ Merchant—Location 2." As shown in FIG. 9, the example UI 900 provides a list of unavailable items 908 corresponding to ordered items that are not available from the "1$^{st}$ Merchant—Location 2" (e.g., "Brand X Natural Peanut Butter," "Organic Bananas, Farm A," and "Winery Y Prosecco"). Once the "Confirm Location Change" 912 is selected, in some examples, the online merchant system 108 may provide the user 102 with a UI for selecting suggested alternatives.

Figure 11:
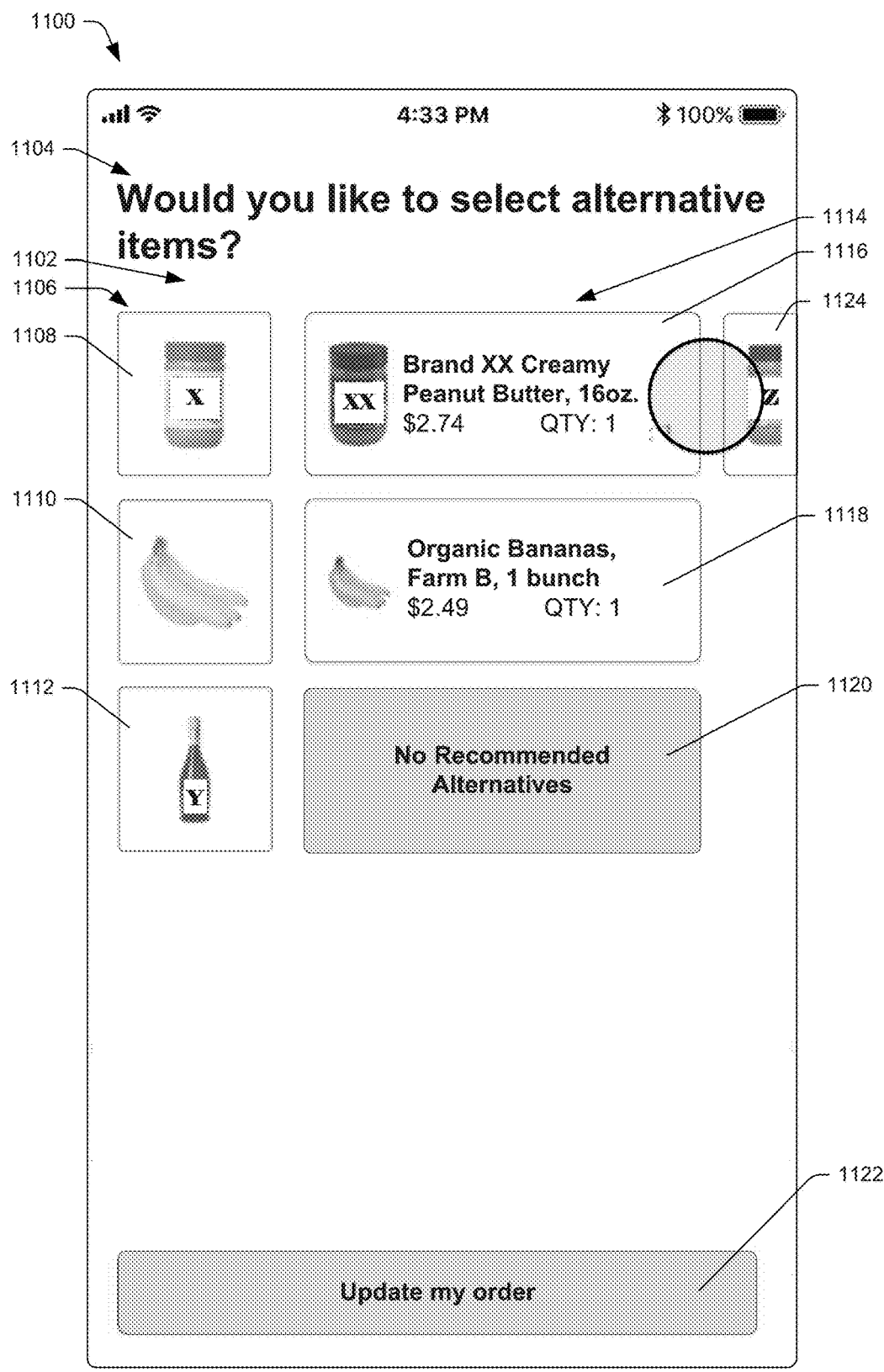
FIG. 11 illustrates an example UI showing example menu for selecting from suggested alternatives for items unavailable at the second location of the first merchant.

For example, FIG. 11 illustrates an example UI 1100 showing an example menu 1102 for selecting from suggested alternatives for items unavailable at the selected merchant location, for example, "1$^{st}$ Merchant—Location 2" shown in FIG. 9. The example UI 1100 shown in FIG. 11 includes a message zone 1104 for providing the user 102 with information related to switching merchant locations. In the example shown in FIG. 11, the message zone 1104 displays a query related to the switch to different merchant location, "Would you like to select alternative items?". In the example UI 1100 shown, the example menu 1100 provides an unavailable items list 1106 displaying the items unavailable from the selected merchant location that were included in the selected items list 126 (e.g., a virtual shopping cart) including the items available from the original merchant location. The example unavailable items list 1106 shown in FIG. 11 includes pictorial depictions of the unavailable items. Some examples may alternatively, or in addition, include textual descriptions of the unavailable items, and/or other types of indications of the unavailable items. As shown in FIG. 11, the unavailable items list 1106 includes a representation of a jar of peanut butter 1108, a representation of a bunch of bananas 1110, and a representation of a bottle of prosecco 1112.

As shown in FIG. 11, the example UI 1100 also includes a suggested alternatives list 1114 providing an opportunity for a user 102 to select item substitutes for the unavailable items. In the example shown, the suggested alternatives list 1114 provides one or more suggested alternatives at positions adjacent the corresponding representations of the unavailable items 1108, 1110, and 1112 in the unavailable items list 1106. For example, adjacent the representation of the unavailable peanut butter 1108, the suggested alternatives list 1114 shows a representation of an alternative peanut butter option 1116 ("Brand XX Creamy Peanut Butter, 16 oz."). This is an example of a suggested alternative for which the item type (peanut butter) is common to the originally selected item from the item selection list, but item brand (Brand XX) and another item characteristic (natural vs. creamy) differ. Similarly, adjacent the representation of the unavailable bananas 1110, the suggested alternatives list 1114 shows a representation of an alternative bananas option 1118 ("Organic Bananas, Farm B, 1 bunch"). This is an example of a suggested alternative for which the item type (bananas) and another item characteristic (organic) are common to the originally selected item from the item selection list, but the item origin (Farm A vs. Farm B) differs. In some examples, if there are no suggested alternatives, the example UI 1100 may display a lack of alternatives notice 1120, for example, as shown. The example suggested alternatives list 1114 shown in FIG. 11 includes pictorial depictions and textual descriptions of the suggested alternatives. Some examples may include other types of indications of the suggested alternatives. In the example shown, the representations of the suggested alternatives permit selection of one or more of those alternatives. As shown in FIG. 11, the example UI 1100 also includes a selector 1122 to permit the user 102 to change the original order according to any items selected from the suggested alternatives list 1114 (e.g., the "Update my order" button shown).

The example UI 1100 shown in FIG. 11 also shows additional suggested alternatives for the peanut butter, which in the example shown, may be viewed by swiping right-to-left on the representation of the alternative peanut butter option 1116. As shown, a left-most edge of another representation of an alternative peanut butter option 1124 is shown, which provides the user 102 with an indication that one or more additional suggested alternatives are available. In the example of FIG. 11, there are no additional suggested alternatives for the organic bananas, as indicated by a lack of an additional suggested alternative adjacent the representation of the alternative bananas option 1118.

Figure 12:
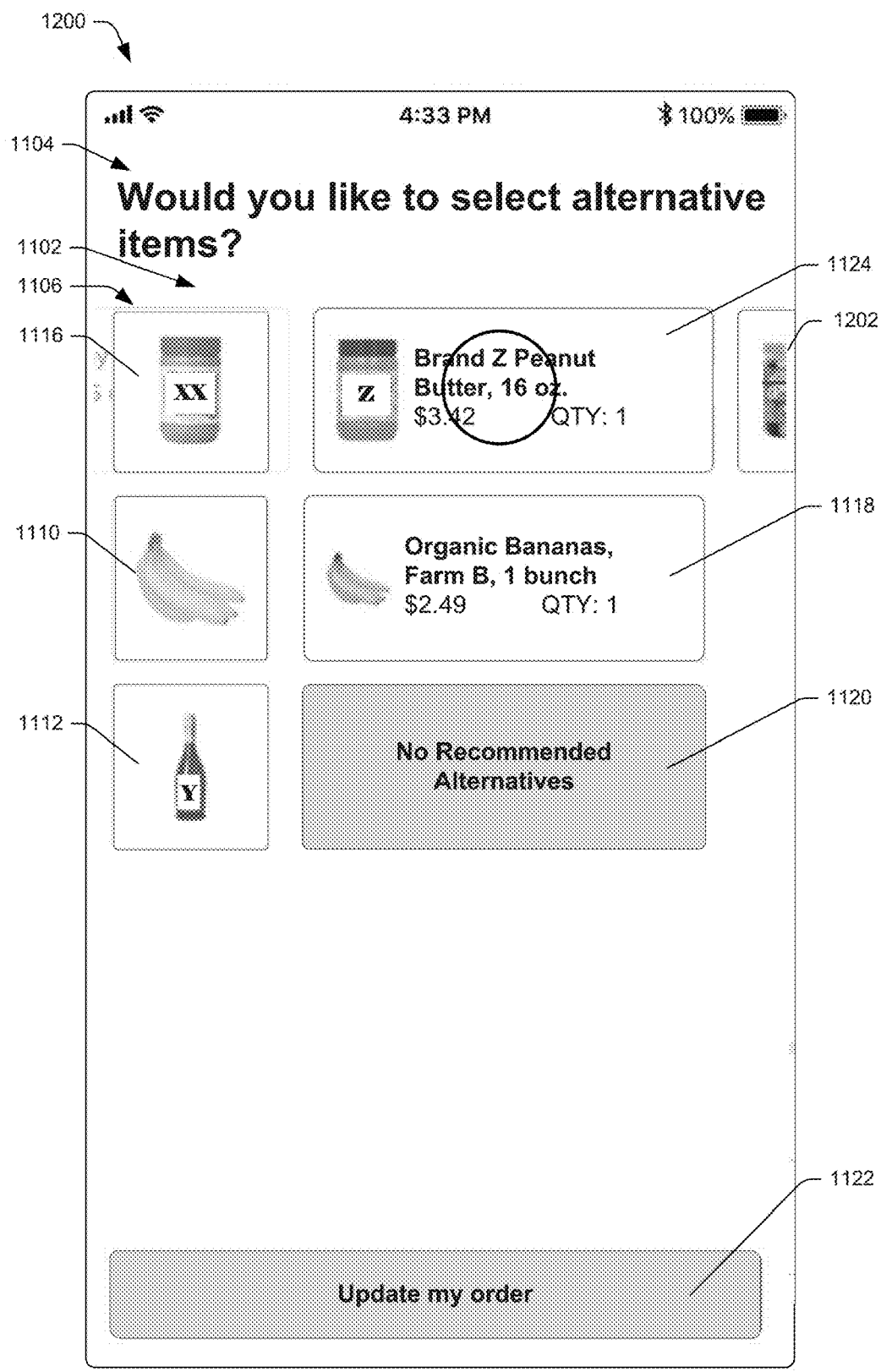
FIG. 12 illustrates an example UI showing an example ability to select from more than one suggested alternative for an example unavailable item.

FIG. 12 illustrates an example UI 1200 following the swiping right-to-left of the representation of the alternative peanut butter option 1116 (Brand XX) shown in FIG. 11 to completely reveal the alternative peanut butter option 1124 ("Brand Z Peanut Butter, 16 oz.") item. This permits the user 102 to select the additional suggested alternative peanut butter from the alternatives. As shown in FIG. 12, a left-most edge of another representation of an alternative peanut butter option 1202 is shown, which provides the user 102 with an indication that an additional suggested alternative for the peanut butter is available, and swiping the alternative peanut butter option 1124 from right-to-left will completely reveal the additional alternative.

Figure 13:
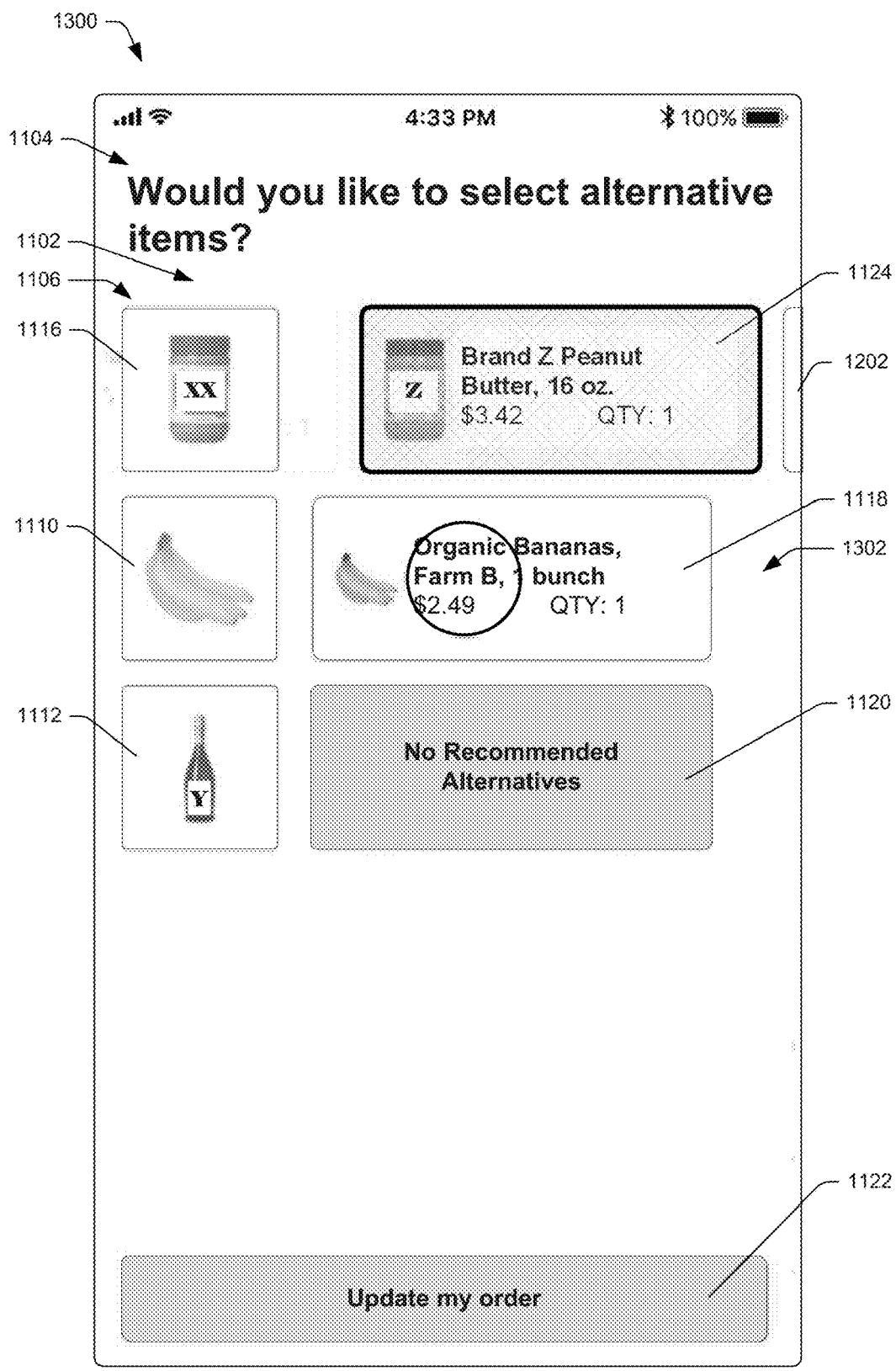
FIG. 13 illustrates an example UI showing an example ability to select from more than one suggested alternative for another example unavailable item.

FIG. 13 illustrates an example UI 1300 in which the alternative peanut butter option 1124 has been selected by the user 102, indicated by highlighting of the representation 1124. Swiping the representation of the alternative bananas option 1118 does not reveal any additional suggested alternatives for the organic bananas, as indicated by a lack of an additional suggested alternative in the space 1302 to the right of the representation of the alternative bananas option 1118.

Figure 14:
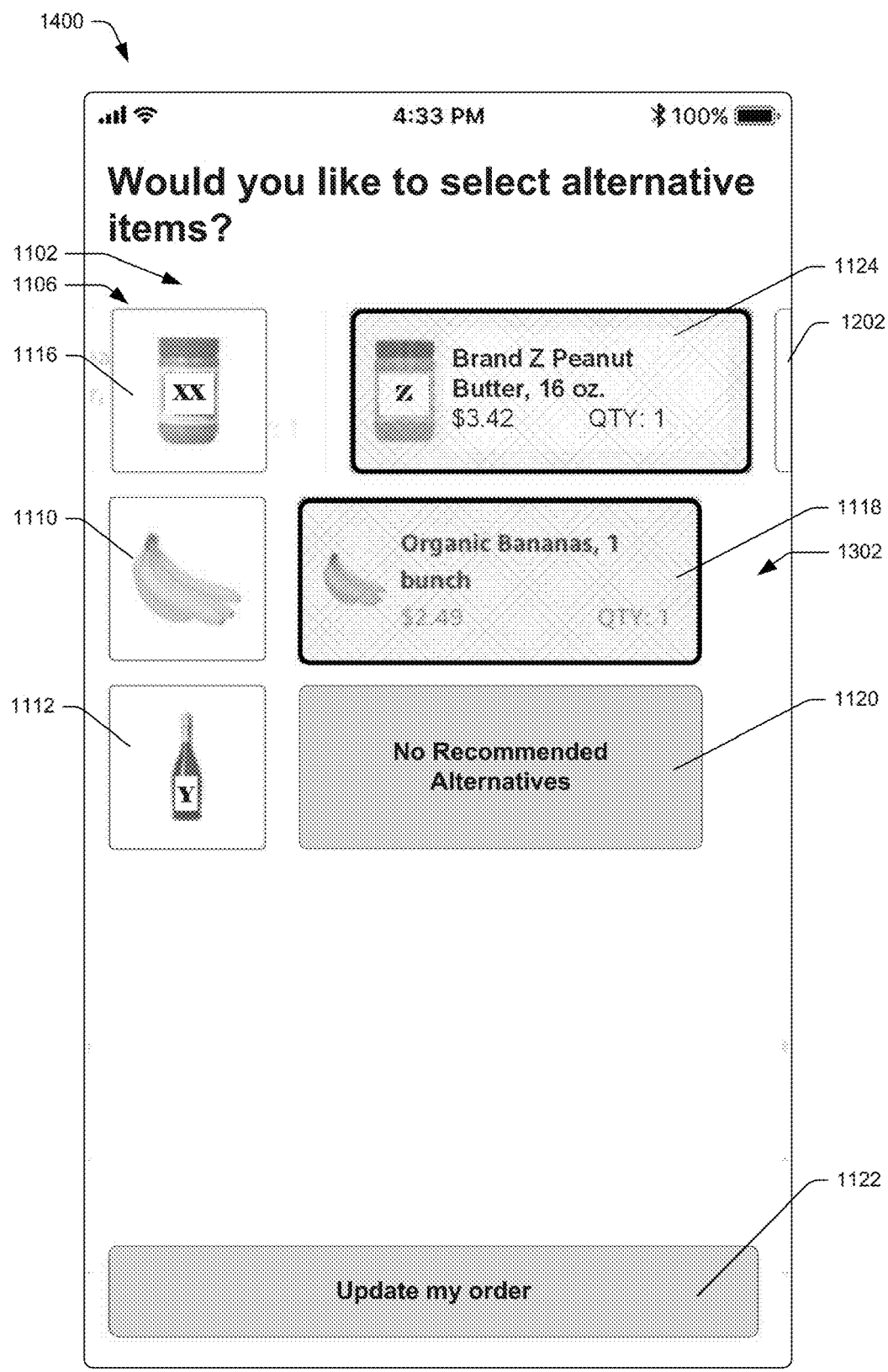
FIG. 14 illustrates an example UI showing an example indication that suggested alternatives have been selected to update an order.

FIG. 14 illustrates an example UI 1400 depicting selection by the user 102 of the suggested alternatives for the peanut butter and the organic bananas. As shown, the user 102 has selected the representation of the alternative peanut butter option 1124 ("Brand Z Peanut Butter, 16 oz.") and the representation of the alternative bananas option 1118 ("Organic Bananas, Farm B, 1 bunch"), as indicated by the highlighting of those representations. As shown in FIG. 12, the user 102 may change the original order according to the items selected from the suggested alternatives list 1114 by selecting the "Update my order" button 1122.

Figure 15:
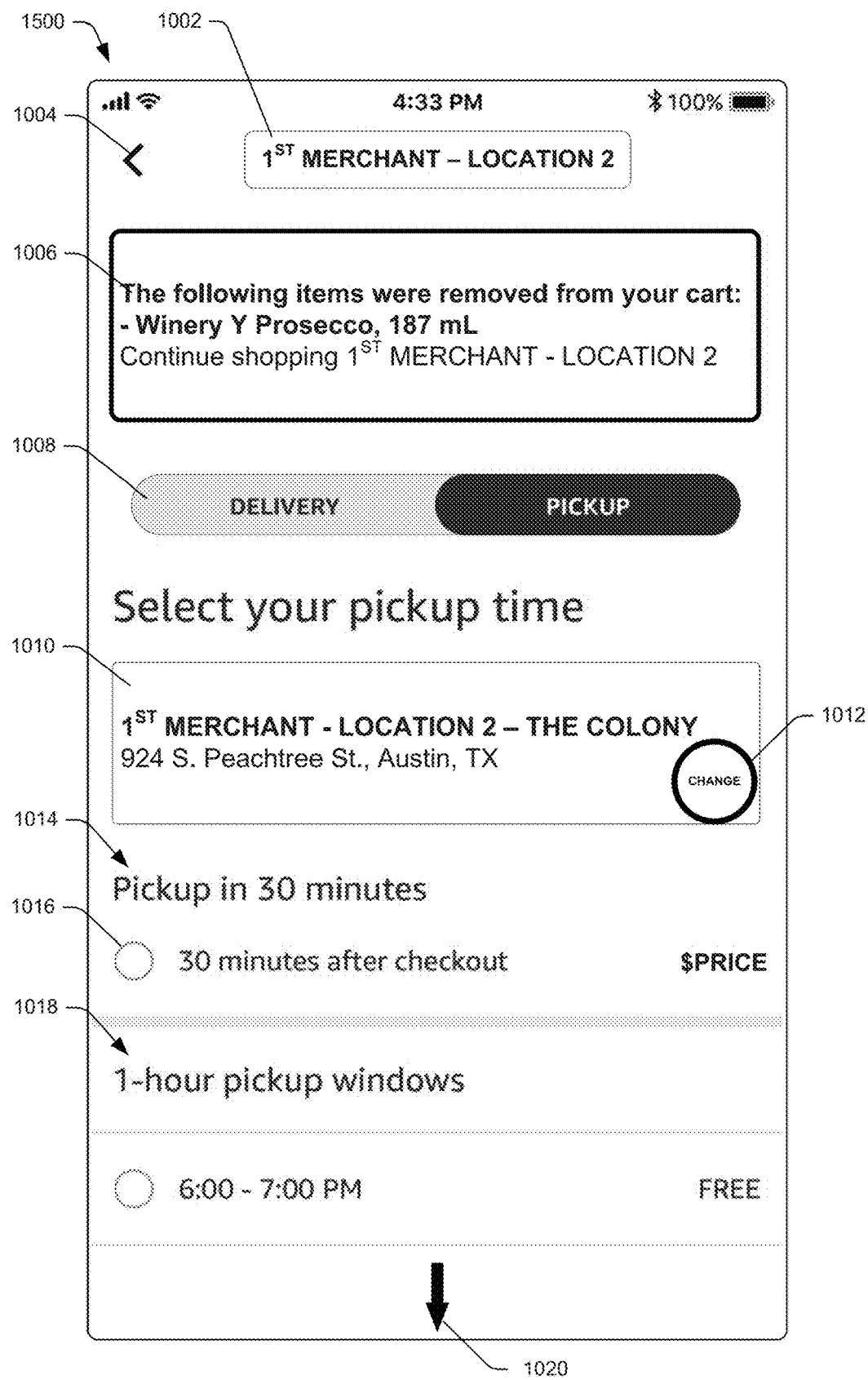
FIG. 15 illustrates an example UI showing another example of selection of the second location of the first merchant and indication of removal of unavailable items from the order.

Once suggested alternatives have been selected, in some examples, a UI at least similar to the example UI 900 shown in FIG. 9 may provide the user 102 with an option to use the "Confirm Location Change" selector 912 to confirm the location change from 1$^{st}$ Merchant—Location 1 to 1$^{st}$ Merchant—Location 2, for example as explained with respect to FIG. 9. As illustrated in FIG. 15, once the "Confirm Location Change" selector 912 has been selected by the user, the example UI 1500 provides the user with information related to the selection. The example UI 1500 includes a banner 1002 indicating the name of the merchant ("1$^{st}$ Merchant—Location 2") and adjacent the banner 1002, a back selector 1004 for enabling the user to return to the previous screen. Below the banner 1002, the example UI 1500 includes a message/selection block 1006 indicating to the user that the items unavailable from the selected merchant location have been removed from the order (e.g., removed from the cart), and providing the user with an ability to select additional items from the selected merchant location by contacting or selecting the message/selection block 1006. For instance, the message/selection block 1006 indicates that "Winery Y Prosecco" has been removed from the user's shopping cart, and further indicates that the user has the option of continuing to shop at the same merchant location, for example, possibly to search for and/or identify one or more additional items that would serve as a substitute for the removed item and/or for additional unrelated items. By contacting/selecting the message/selection block 1006, the user 102, in some examples, may be provided with a UI providing menus for selecting additional items to add to the previously ordered items.

In addition, the example UI 1500 shown in FIG. 15 also includes a selector 1008 in the form of an example slider enabling the user to select that the ordered items will be picked-up or delivered. In the example shown, the selector 1008 is in the "Pickup" position. In the example shown, because the pickup option has been selected, below the selector 1008 the example UI 1500 includes a pickup location area 1010 showing the merchant location at which the ordered items may be picked-up. In the example shown, the pickup location area 1010 advises the user that the currently selected pick-up location is the "1$^{st}$ Merchant—Location 2—The Colony" at "924 S. Peachtree St., Austin, Tex." The example pickup location area 1010 also provides an option for the user to change locations by selecting the "Change" button 1012, as explained herein. Below the pickup location area 1010, the example UI 1500 includes a pickup time selection area 1014, which provides several time options from which the user may select for picking up the items from the selected merchant location. In the example shown, the user may choose, for a fee, to pick-up the items within thirty minutes from placing the order at 1016. Alternatively, the example UI 1500 shown permits the user to choose to pick-up the items during several one-hour pickup windows 1018, including an arrow 1020 indicating that the user may scroll down to see additional pick-up time options.

Figure 16:
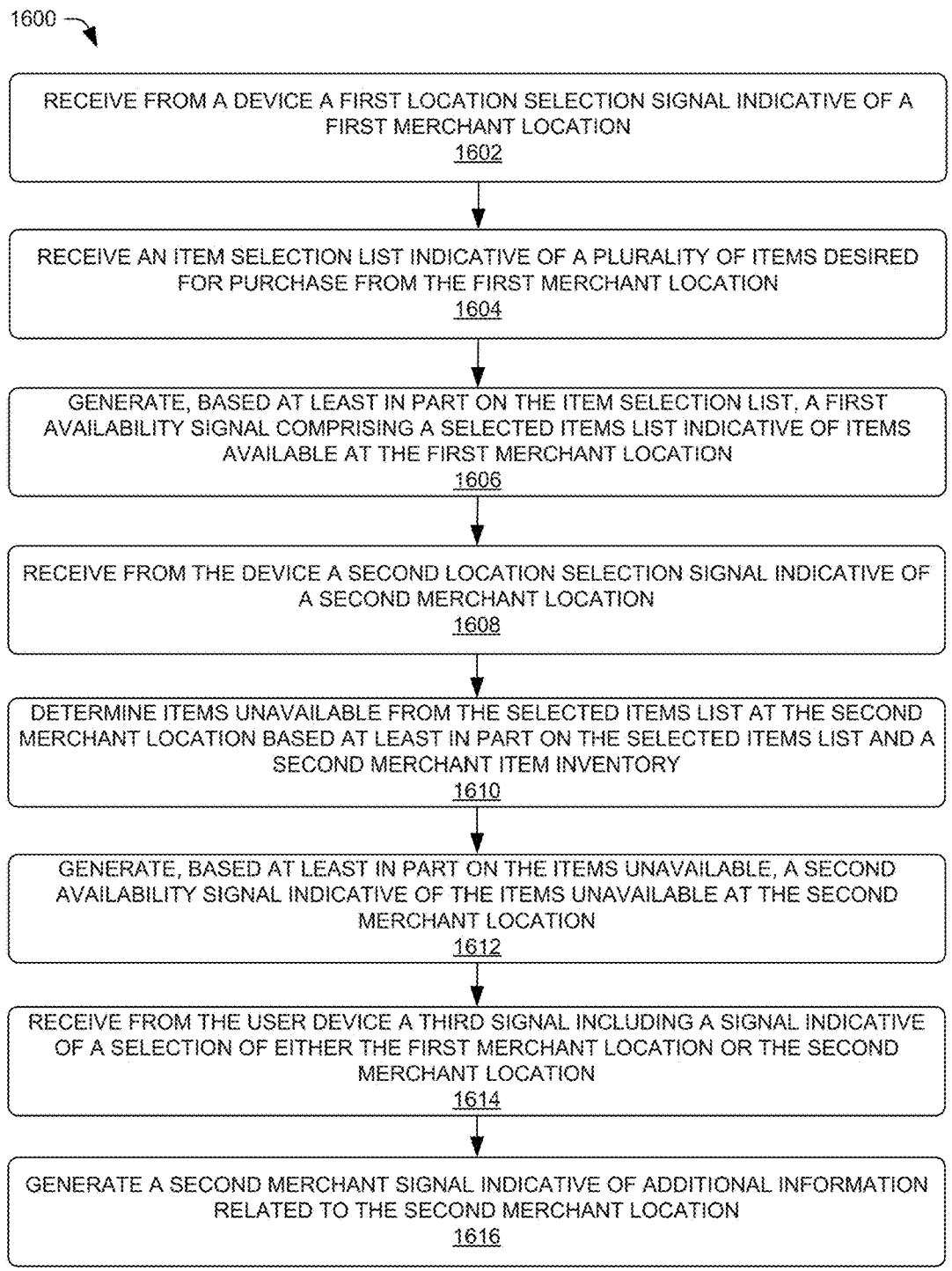
FIG. 16 illustrates an example process for providing a user with a preview of items available from a merchant location other than a previously selected merchant location.

FIG. 16 illustrates an example process for providing a user (e.g., a customer) with a preview on a user device of items available from a merchant location other than a previously selected merchant location. This process is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 16 illustrates a flow diagram of an example process 1600 of providing a user (e.g., a customer) with a preview on a user device of items available from a merchant location other than a previously selected merchant location, for example, as described herein. The following actions described with respect to FIG. 16 may be performed by the online merchant system 108 and/or the content server(s) 202, for example, as illustrated with respect to FIGS. 1-3.

The example process 1600, at 1602, may include receiving from a device a first location selection signal indicative of a first merchant location. For example, a user, such as a customer, may use a user interface to select a first merchant location at which to pick-up ordered items for purchase or from which the ordered items may be delivered. In some examples, the first location selection signal may be indicative of the location of the user device. In some examples, the first location selection signal may be indicative of preferences associated with a user account corresponding to the user of the user device. In some examples, the online merchant system may include a location module configured to receive the first location selection signal and, based at least in part on the first location signal, identify the first merchant location, for example, as described herein.

At 1604, the process 1600, in some examples, may include receiving an item selection list of a plurality of items desired for purchase from the first merchant location. In some examples, the item selection list may be incorporated into the first location selection signal. In some examples, the user, using a user interface, may select one or more items for ordering from the first merchant location. The item selection list may be indicative of the one or more ordered items. In some examples, the online merchant system may include an item selection module, which may provide the user with a user interface for selecting the one or more items, for example, as described herein.

At 1606, the process 1600 may include generating, based at least in part on the item selection list, a first availability signal comprising a selected items list indicative of the items available at the first merchant location. For example, the online merchant system may include a comparison module configured to compare the ordered items to the items available in the first merchant item inventory. Based on the comparison, the comparison module may identify items from the ordered items that are available (e.g., available and/or unavailable) at the first merchant location. In some examples, generating the first availability signal may include sending to the user device the first availability signal.

The example process 1600 may also include, at 1608, receiving from the user device a second location selection signal indicative of a second merchant location. For example, the user may select a second merchant location at which to pick-up the ordered items or from which the ordered items may be delivered. In some such examples, the user may use a user interface to select the second merchant location from among a number of merchant locations, for example, as described herein. The online merchant system may include a location module configured to receive the second location selection signal and, based at least in part on the second location selection signal, identify the second merchant location, for example, as described herein.

At 1610, the example process 1600 may include determining items unavailable from the selected items list at the second merchant location based at least in part on the selected items list (possibly modified by the user) and a second merchant item inventory of items available at the second merchant location. As noted, the online merchant system may include an inventory module configured to access an item inventory associated with one or more merchant locations, and upon receipt of the second location selection signal and identification of the second merchant location, the inventory module may be configured to access a second merchant item inventory providing the available inventory of the second merchant location. As noted, the item inventory may include one or more of an item type, an item brand, an item origin, an item quantity/size, an item price, or other characteristics associated with the respective item.

The example process 1600, at 1612, may include generating, based at least in part on the items unavailable, a second availability signal indicative of the items unavailable at the second merchant location. For example, a comparison module may compare the ordered items to the items available in the second merchant item inventory. Based on the comparison, the comparison module may identify items from the ordered items that are unavailable (e.g., available and/or unavailable) at the second merchant location. The second availability signal may be sent to the user device, thereby providing a preview of the ordered items unavailable (e.g., available and/or unavailable) at the second merchant location.

At 1614, the process 1600 may include receiving from the user device a third signal including a signal indicative of a selection of either the first merchant location or the second merchant location from which to order the ordered items. For example, a user interface may be provided on the user device to enable the user to select either the first merchant location or the second merchant location for pick-up or delivery of the ordered items. In some examples, if the second merchant location is selected and does not include some of the ordered items, the items unavailable at the second merchant location will be removed from the order.

In some examples of the process 1600, at 1616, the process 1600 may include generating a second merchant signal indicative of additional information related to the second merchant location, for example, as described herein. For example, the second merchant signal may include one or more of (1) a second merchant characteristics signal indicative of characteristics related to the second merchant location, (2) a suggested alternatives signal indicative of item substitutes for items from the plurality of items desired for purchase from the first merchant not available at the second merchant location, or (3) a locality information signal indicative of at least one attribute related to the second location at which the second merchant location is located. For example, the second merchant characteristics signal may be indicative that the second merchant location includes at least one of a salad bar, a hot food bar, a prepared foods bar, a sushi bar, a sommelier, a wine bar, a cheese bar, a bakery, a seafood counter, a butcher counter, an olive bar, a juice bar, an international foods section, a floral department, a café, a pharmacy, an optometrist, financial services, etc. The online merchant system, in some examples, may include a merchant location information module that accesses merchant location information to generate merchant characteristics signals.

In some examples, the second merchant signal may include a suggested alternatives signal indicative of item substitutes for items from the plurality of items desired for purchase from the first merchant location not available at the second merchant location. For example, the item substitutes may include items having an item type in common with the items from the plurality of items desired for purchase from the first merchant not available at the second merchant, and at least one of a different item origin, a different item brand, a different item quantity, or a different item price. For example, the online merchant system may include a suggested alternatives module configured to determine one or more item substitutes for the ordered items that are not available (e.g., at the second merchant location).

In some examples, the second merchant location signal may include a locality information signal indicative of at least one attribute related to the second location. In some examples, the at least one attribute may include at least one of traffic information for a route between the user device and the second merchant location, traffic conditions at the second merchant location, or weather conditions at the second merchant location.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
memory; and
one or more computer-executable instructions stored in the memory and executable by the one or more processors to perform operations comprising:
receiving, via a mobile application residing on a device, a first location selection signal indicative of a first merchant location of a merchant and associated with an online merchant system;

receiving, from the device, an item selection list indicative of a plurality of food items desired for purchase from the first merchant location;

determine a quantity of the plurality of food items available for pickup at at least the first merchant location of the merchant and a second merchant location of the merchant or a different merchant;

responsive to determining the quantity of the plurality of food items available for pickup at at least the first merchant location and the second merchant location, cause a user interface of the mobile application to display a scrollable list of selectable icons, wherein an individual selectable icon of the scrollable list (i) is associated with a corresponding merchant location of a plurality of merchant locations, and (ii) includes an availability indicator indicating a quantity of the plurality of food items available at the corresponding merchant location, and wherein the scrollable list includes at least a first selectable icon associated with the first merchant location and a second selectable icon associated with the second merchant location;

sending to the device, based at least in part on the item selection list, a first availability signal comprising a selected items list indicative of a first set of food items of the plurality of food items available at the first merchant location, wherein the first availability signal causes a first representation of the first set of food items available at the first merchant location to be displayed in the user interface;

receiving, from the device, a second location selection signal indicative of a user selection of the second selectable icon associated with the second merchant location from the scrollable list;

determining a second set of food items, of the plurality of food items, unavailable at the second merchant location based at least in part on a second merchant item inventory at the second merchant location;

responsive to determining the second set of food items unavailable at the second merchant location, sending to the device:
  a second availability signal indicative of the second set of food items unavailable at the second merchant location, wherein the second availability signal causes a second representation of the second set of food items unavailable at the second merchant location to be displayed in the user interface; and
  a suggested alternatives signal indicative of item substitutes for one or more of the second set of food items unavailable at the second merchant location, wherein the suggested alternatives signal causes a third representation of the item substitutes to be displayed in the user interface, wherein the third representation includes an image of an item substitute displayed adjacent to a corresponding food item that is unavailable at the second merchant location; and receiving, from the device, an order for fulfillment by the second merchant location that includes a third set of food items available at the second merchant location and one or more of the item substitutes.

2. The system of claim 1, the operations further comprising sending to the device a merchant location signal indicative of information related to the second merchant location, wherein the merchant location signal comprises at least one of:
  a merchant characteristics signal indicative of characteristics related to the second merchant location; or
  a locality information signal indicative of at least one attribute related to the second merchant location.

3. The system of claim 2, wherein the merchant location signal comprises the merchant characteristics signal indicative of characteristics related to the second merchant location, the characteristics related to the second merchant location comprising at least one of a salad bar, a hot food bar, a prepared foods bar, a sushi bar, a sommelier, a wine bar, a cheese bar, a bakery, a seafood counter, a butcher counter, an olive bar, a juice bar, an international foods section, a floral department, a café, a pharmacy, an optometrist, or financial services.

4. The system of claim 2, wherein the merchant location signal comprises the locality information signal indicative of at least one attribute related to the second merchant location, the at least one attribute comprising at least one of traffic information for a route between the device and the second merchant location, traffic conditions at the second merchant location, or weather conditions at the second merchant location.

5. The system of claim 1, wherein:
  each of the plurality of food items desired for purchase from the first merchant location has item characteristics comprising at least one of an item type, an item origin, an item brand, an item quantity, or an item price; and
  the item substitutes comprise a fourth set of food items having an item type in common with the second set of food items unavailable at the second merchant location, and at least one of a different item origin, a different item brand, a different item quantity, or a different item price.

6. A method comprising:
  receiving, from a device, a first location selection signal indicative of a first merchant location of a first merchant;
  receiving an item selection list indicative of a plurality of items desired for purchase from the first merchant location;
  determining a quantity of the plurality of items available for pickup at at least the first merchant location and a second merchant location of a second merchant;
  responsive to determining the quantity of the plurality of items available for pickup at at least the first merchant location and the second merchant location, causing a user interface to be displayed on a display of the device, the user interface including a scrollable list of selectable icons wherein an individual selectable icon of the scrollable list (i) is associated with a corresponding merchant location of a plurality of merchant locations, and (ii) includes an availability indicator indicating a quantity of the plurality of items available at the corresponding merchant location, and wherein the scrollable list includes at least a first selectable icon associated with the first merchant location and a second selectable icon associated with the second merchant location;
  sending, to the device, and based at least in part on the item selection list, a first availability signal comprising a selected items list indicative of items of the plurality of items available at the first merchant location, wherein the first availability signal causes a first representation of the items available at the first merchant location to be displayed in the user interface;

receiving, from the device, a second location selection signal indicative of a user selection of the second selectable icon associated with the second merchant location from the scrollable list;

determining items, of the plurality of items, unavailable at the second merchant location based at least in part on a second merchant item inventory at the second merchant location;

at least partly responsive to determining the items unavailable at the second merchant location, sending, to the device:

a second availability signal indicative of the items unavailable at the second merchant location, wherein the second availability signal causes a second representation of the items unavailable at the second merchant location to be displayed in the user interface; and a suggested alternatives signal indicative of item substitutes for one or more of the items unavailable at the second merchant location, wherein the suggested alternatives signal causes a third representation of the item substitutes to be displayed in the user interface, wherein the third representation includes an image of an item substitute displayed adjacent to a corresponding item that is unavailable at the second merchant location; and receiving, from the device, an order for fulfillment by the second merchant from the second merchant location that includes the items available at the second merchant location and one or more of the item substitutes.

7. The method of claim 6, wherein receiving the first location selection signal comprises:

receiving a device location signal from the device, the device location signal indicative of a location of the device; and determining the first merchant location based at least in part on the device location signal.

8. The method of claim 6, wherein receiving the first location selection signal comprises:

receiving a profile signal indicative of information related to a person associated with the device, the information comprising information related to a preferred merchant location.

9. The method of claim 6, wherein the first merchant location and the second merchant location are owned by different entities.

10. The method of claim 6, further comprising generating a merchant signal indicative of additional information related to the second merchant location, wherein the merchant signal comprises at least one of:

a merchant characteristics signal indicative of characteristics related to the second merchant location; or a locality information signal indicative of at least one attribute related to the second merchant location.

11. The method of claim 6, further comprising generating a merchant signal indicative of additional information related to the second merchant location, wherein the merchant signal comprises a merchant characteristics signal indicative of characteristics related to the second merchant location, the characteristics related to the second merchant location comprising at least one of an indication that the second merchant location comprises at least one of a salad bar, a hot food bar, a prepared foods bar, a sushi bar, a sommelier, a wine bar, a cheese bar, a bakery, a seafood counter, a butcher counter, an olive bar, a juice bar, an international foods section, a floral department, a café, a pharmacy, an optometrist, or financial services.

12. The method of claim 6, wherein:

each of the items from the selected items list has item characteristics comprising at least one of an item type, an item origin, an item brand, an item quantity, or item price; and the item substitutes comprise items having an item type in common with the items from the plurality of items desired for purchase from the first merchant location not available at the second merchant location, and at least one of a different item origin, a different item brand, a different item quantity, or a different item price.

13. The method of claim 12, further comprising:

receiving, from the device, a suggestion biasing signal comprising information related to weighting the item characteristics based at least in part on preferences associated with a user profile associated with the device; and generating the suggested alternatives signal based at least in part on the suggestion biasing signal.

14. The method of claim 12, further comprising generating the suggested alternatives signal based at least in part on previous item selections associated with the device.

15. The method of claim 6, further comprising generating a merchant signal indicative of additional information related to the second merchant location, wherein the merchant signal comprises a locality information signal indicative of at least one attribute related to the second merchant location, the at least one attribute comprising at least one of traffic information for a route between the device and the second merchant location, traffic conditions at the second merchant location, or weather conditions at the second merchant location.

16. A system comprising:

one or more processors;

memory; and one or more computer-executable instructions stored in the memory and executable by the one or more processors to perform operations comprising:

receiving, from a device, a first location selection signal indicative of a first merchant location of a first merchant;

receiving, from the device, an item selection list indicative of a plurality of items desired for purchase from the first merchant location, each of the plurality of items having at least one of a corresponding item type, a corresponding item brand, a corresponding item quantity, or a corresponding item price;

determining a quantity of the plurality of items available for pickup at at least the first merchant location and a second merchant location of a second merchant;

responsive to determining the quantity of the plurality of items available for pickup at at least the first merchant location and the second merchant location, causing a user interface to be displayed on a display of the device, the user interface including a scrollable list of selectable icons, wherein an individual selectable icon of the scrollable list (i) is associated with a corresponding merchant location of a plurality of merchant locations, and (ii) includes an availability indicator indicating a quantity of the plurality of items available at the corresponding merchant location, and wherein the scrollable list includes at least a first selectable icon associated with the first merchant location and a second selectable icon associated with the second merchant location;

sending, to the device, and based at least in part on the item selection list, a first availability signal comprising a selected items list indicative of items of the plurality of items available at the first merchant location, wherein the first availability signal causes a first representation of the items available at the first merchant location to be displayed in the user interface;

receiving, from the device, a second location selection signal indicative of a user selection of the second selectable icon associated with the second merchant location from the scrollable list;

determining items, of the plurality of items, unavailable at the second merchant location based at least in part on a second merchant item inventory at the second merchant location;

at least partly responsive to determining the items unavailable at the second merchant location, sending, to the device:
 a second availability signal indicative of the items unavailable at the second merchant location, wherein the second availability signal causes a second representation of the items unavailable at the second merchant location to be displayed in the user interface; and
 a suggested alternatives signal indicative of item substitutes for one or more of the items unavailable at the second merchant location, wherein the suggested alternatives signal causes a third representation of the item substitutes to be displayed in the user interface, wherein the third representation includes an image of an item substitute displayed adjacent to a corresponding item that is unavailable at the second merchant location; and receiving, from the device, an order for fulfillment by the second merchant from the second merchant location that includes the items available at the second merchant location and one or more of the item substitutes.

17. The system of claim 16, the operations further comprising:
 identifying the item substitutes that differ from the items unavailable at the second merchant location by at least one of item brand, item origin, item quantity, or item price; and
 generating the suggested alternatives signal based at least in part on the item substitutes identified.

18. The system of claim 17, wherein generating the suggested alternatives signal comprises generating the suggested alternatives signal based at least in part on previous item selections associated with the device.

19. The system of claim 16, the operations further comprising:
 receiving, from the device, a third location selection signal indicative of a user selection of a third merchant location of a third merchant from the scrollable list;
 determining items, of the plurality of items, unavailable at the third merchant location based at least in part on a third merchant item inventory at the third merchant location; and
 sending to the device, based at least in part on the items unavailable at the third merchant location, a third availability signal indicative of the items unavailable at the third merchant location.

20. The system of claim 16, the operations further comprising, in response to receiving the second location selection signal, causing the user interface to display an indication that the items unavailable from the second merchant location will be removed from the order in response to the receiving the order for fulfillment from the second merchant location.

* * * * *